United States Patent
Akama

(10) Patent No.: US 9,448,989 B2
(45) Date of Patent: Sep. 20, 2016

(54) TERMINAL DEVICE, CONVERSION WORD CANDIDATE SYNCHRONIZATION METHOD, AND CONVERSION WORD CANDIDATE SYNCHRONIZATION PROGRAM

(71) Applicant: FUJITSU LIMITED, Kawasaki-shi, Kanagawa (JP)

(72) Inventor: Katsuaki Akama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 140 days.

(21) Appl. No.: 14/135,423

(22) Filed: Dec. 19, 2013

(65) Prior Publication Data

US 2014/0297265 A1    Oct. 2, 2014

(30) Foreign Application Priority Data

Mar. 28, 2013   (JP) .................................. 2013-070685

(51) Int. Cl.
| | |
|---|---|
| G06F 17/27 | (2006.01) |
| G06F 17/20 | (2006.01) |
| G10L 15/00 | (2013.01) |
| G06F 17/28 | (2006.01) |
| G06F 17/30 | (2006.01) |
| G06F 17/25 | (2006.01) |
| G06F 3/01 | (2006.01) |
| G06F 3/023 | (2006.01) |

(52) U.S. Cl.
CPC ............... *G06F 17/25* (2013.01); *G06F 3/018* (2013.01); *G06F 3/0237* (2013.01)

(58) Field of Classification Search
CPC ........ G06F 17/25; G06F 17/20; G06F 17/28; G06F 17/30; G10L 15/00
USPC .................. 704/8, 9, 235, 10, 252; 715/246
See application file for complete search history.

(56) References Cited

U.S. PATENT DOCUMENTS

| | | | | |
|---|---|---|---|---|
| 6,282,508 | B1 * | 8/2001 | Kimura | G06F 17/2863 704/10 |
| 8,036,878 | B2 * | 10/2011 | Assadollahi | G06F 3/0237 704/10 |
| 8,498,864 | B1 * | 7/2013 | Liang | G10L 15/22 369/25.01 |
| 8,620,658 | B2 * | 12/2013 | Nakade | G10L 15/30 704/10 |

(Continued)

FOREIGN PATENT DOCUMENTS

| | | |
|---|---|---|
| JP | 2005-322250 A | 11/2005 |
| JP | 2010-198489 A | 9/2010 |

(Continued)

OTHER PUBLICATIONS

Extended European Search Report mailed Jul. 7, 2014 in European Patent Application No. 13198574.9.

*Primary Examiner* — Pierre-Louis Desir
*Assistant Examiner* — Seong Ah A Shin
(74) *Attorney, Agent, or Firm* — Maschoff Brennan

(57) ABSTRACT

A terminal device includes: a memory that stores a candidate group including a plurality of conversion word candidates for an input character; and a processor that, if a display rank of any candidate in the candidate group is changed, determines whether the changed display rank is included in a predetermined range of display ranks and, if the changed display rank is included in the predetermined range of display ranks, lets a communication unit transmit the candidate group including the changed display rank to another terminal device.

7 Claims, 19 Drawing Sheets

(56) References Cited

U.S. PATENT DOCUMENTS

| | | | |
|---|---|---|---|
| 2005/0262166 A1* | 11/2005 | Rajeev | G06F 17/30581 |
| 2006/0190256 A1* | 8/2006 | Stephanick | G06F 17/2735 704/252 |
| 2011/0202836 A1* | 8/2011 | Badger | G06F 3/0237 715/702 |
| 2011/0225149 A1* | 9/2011 | Takahashi | G06F 17/30672 707/723 |
| 2013/0124188 A1* | 5/2013 | Li | G06F 3/0237 704/8 |
| 2013/0179148 A1* | 7/2013 | Dent | G06F 17/2735 704/9 |

FOREIGN PATENT DOCUMENTS

| | | |
|---|---|---|
| JP | 2011-244438 A | 12/2011 |
| WO | 2008/128473 | 10/2008 |

* cited by examiner

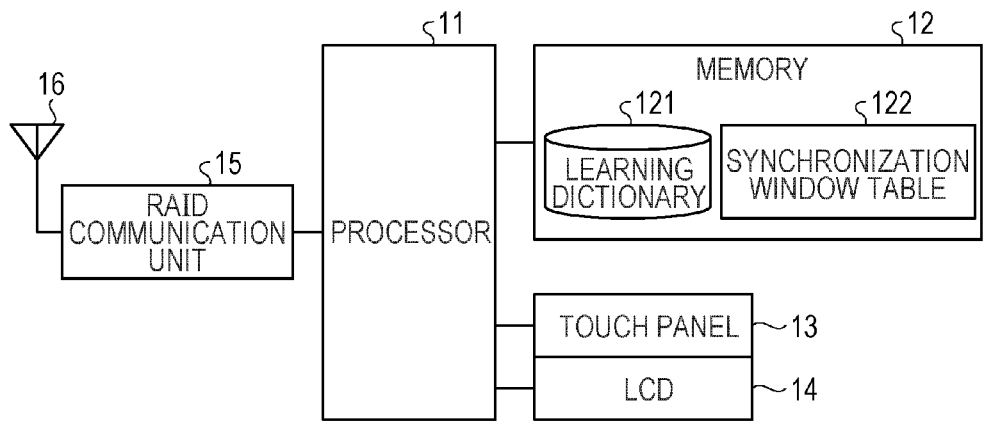

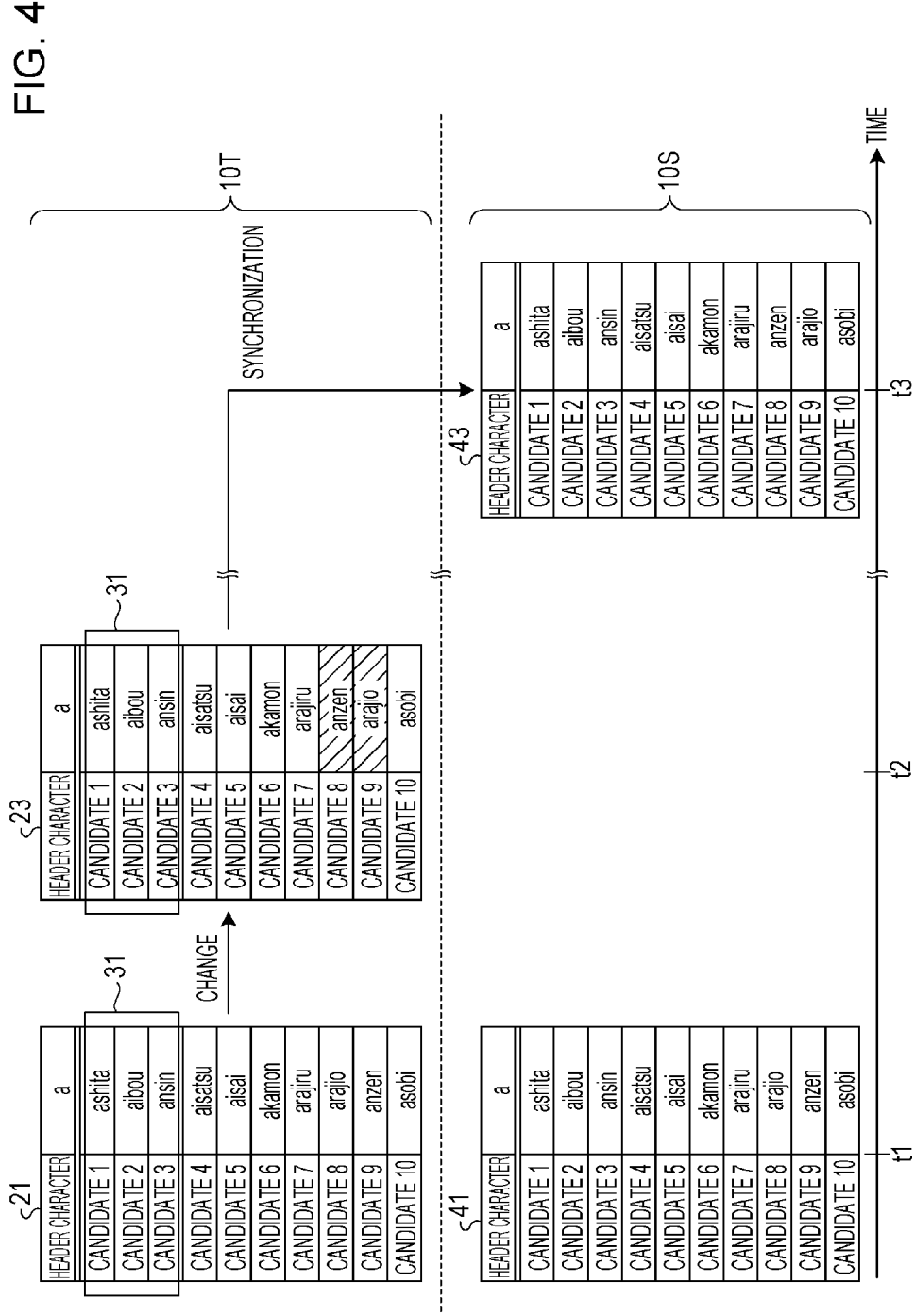

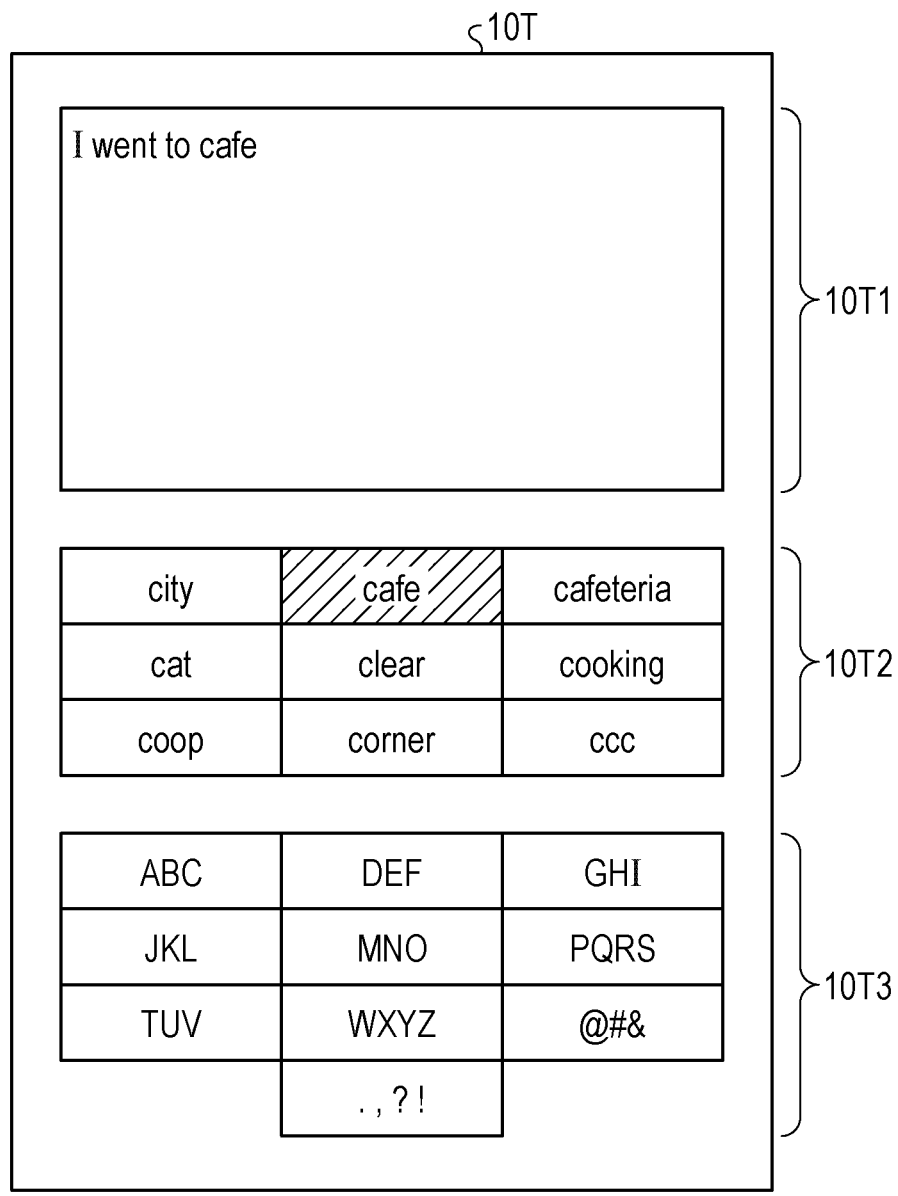

FIG. 16

| MODEL IDENTIFIER | TERMINAL TYPE | SCREEN SIZE | SYNCHRONIZATION WINDOW SIZE |
|---|---|---|---|
| 10S | SMART PHONE | 4.3 INCHES | 18 |
| 10T | TABLET TERMINAL | 10.1 INCHES | 46 |

TERMINAL DEVICE, CONVERSION WORD CANDIDATE SYNCHRONIZATION METHOD, AND CONVERSION WORD CANDIDATE SYNCHRONIZATION PROGRAM

CROSS-REFERENCE TO RELATED APPLICATION

This application is based upon and claims the benefit of priority of the prior Japanese Patent Application No. 2013-070685, filed on Mar. 28, 2013, the entire contents of which are incorporated herein by reference.

FIELD

The embodiments discussed herein are related to a terminal device, a conversion word candidate synchronization method, and a conversion work candidate synchronization program.

BACKGROUND

A terminal device that receives character input often has a learning dictionary for converting hiragana characters or katakana characters inputted by the user into kanji characters so that the user easily inputs kanji characters. In kana-kanji conversion with a learning dictionary, conversion candidates are learned at any time based on the history of conversion made by the user and the learning dictionary is updated as occasion calls. In the updating of the learning dictionary, the priorities of many conversion candidates for a certain kana character are updated as occasion calls based on the history of conversion made by each user. Accordingly, when the user makes kana-kanji conversion, a plurality of conversion candidates for the kana character input by the user appear on a selection screen according to the user's preferences and the priority specific to the user. The learning dictionary enables the user to quickly input kanji characters through kana-kanji conversion by learning the history of conversion made by the user.

A terminal device with a learning dictionary as described above is a multifunction mobile terminal device such as, for example, a smart phone, tablet terminal. Recently, along with the spread of multifunction mobile terminal devices, there are the growing number of users who have a plurality of terminal devices (for example, a smart phone and tablet terminal) together.

Both learning and updating are performed separately between the learning dictionary in a smart phone and the learning dictionary in a tablet. For the user having both a smart phone and a tablet terminal, the frequency of learning for one terminal device is less than the frequency assumed when the user has only one terminal device. Accordingly, even when a single user has both a smart phone and a tablet terminal, differences in the content of learning arise between the terminal devices, causing differences in the priorities of conversion candidates between the terminal devices. As a result, if a single user inputs the same kana character, a plurality of conversion candidates appear in different priorities on the selection screens of both terminal devices.

Accordingly, the user having both a smart phone and a tablet terminal frequently encounters an unexpected conversion candidate each time the user changes the terminal device to use, possibly causing confusion.

On the other hand, there is a related art technology that interconnects a first electronic device and a second electronic device via a wireless medium so as to synchronize data between them.

Japanese Laid-open Patent Publication No. 2005-322250 is an example of the related art.

SUMMARY

According to an aspect of the invention, A terminal device includes: a memory that stores a candidate group including a plurality of conversion word candidates for an input character; and a processor that, if a display rank of any candidate in the candidate group is changed, determines whether the changed display rank is included in a predetermined range of display ranks and, if the changed display rank is included in the predetermined range of display ranks, lets a communication unit transmit the candidate group including the changed display rank to another terminal device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a block diagram depicting an example of a terminal device according to embodiment 1;

FIG. 2 depicts an example of a synchronization window table according to embodiment 1;

FIG. 4 depicts an example of the learning dictionary according to embodiment 1;

FIG. 13B depicts an example of display of the tablet terminal according to embodiment 3;

FIG. 16 depicts an example of a synchronization window table according to embodiment 5.

DESCRIPTION OF EMBODIMENTS

Figure 3:
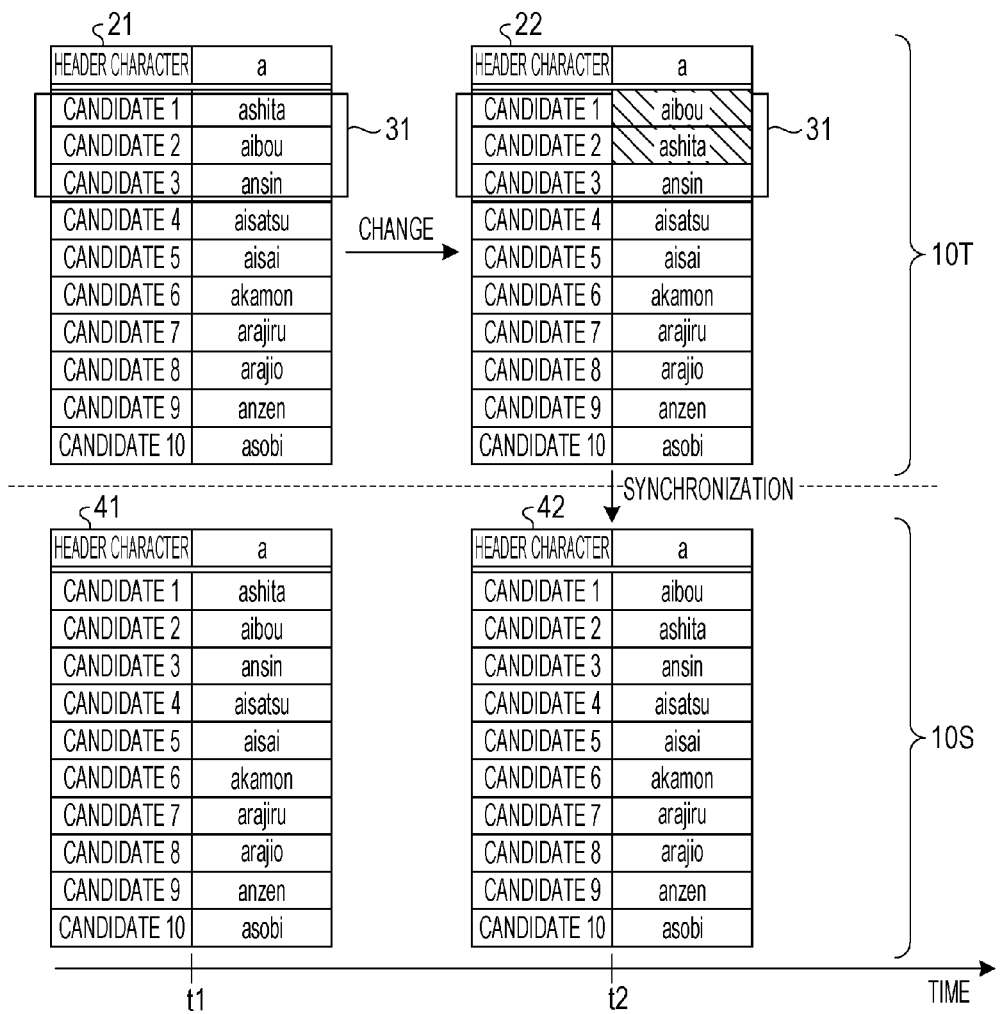
FIG. 3 depicts an example of a learning dictionary according to embodiment 1.

Embodiments of a terminal device, a conversion word candidate synchronization method, and a conversion word candidate synchronization program will be described in detail with reference to the drawings. These embodiments do not restrict the terminal device, the conversion word candidate synchronization method, and the conversion word candidate synchronization program. In the embodiments, components with the same function are given the same reference characters to omit duplicate descriptions.

Embodiment 1

Structure of a Terminal Device

FIG. 1 is a block diagram depicting an example of a terminal device according to embodiment 1. In FIG. 1, a terminal device 10 includes a processor 11, a memory 12, a touch panel 13, a liquid crystal display (LCD) 14, a radio communication unit 15, and an antenna 16. The touch panel 13 and the LCD 14 are laminated together.

The memory 12 stores a learning dictionary 121 and a synchronization window table 122. The learning dictionary 121 and the synchronization window table 122 will be described in detail later. An example of the memory 12 is a RAM such as an SDRAM, a ROM, a flash memory, or so on.

The processor 11 performs various processes of the terminal device 10. Particularly, the processor 11 performs synchronization of the learning dictionary 121 with other terminal devices based on an input to the touch panel 13 from the user. In addition, the processor 11 displays various screens on the LCD 14 based on the content of the learning dictionary 121. In addition, the processor 11 exchanges various types of information with other terminals using the radio communication unit 15 and the antenna 16. An example of the processor 11 is a central processing unit (CPU), a digital signal processor (DSP), a field programmable gate array (FPGA), or so on. The processor 11 will be described in detail later.

The radio communication unit 15 performs near field radio communication with other terminal devices and receives radio signals via the antenna 16 from other terminal devices. For example, the wireless communication unit 15 performs near field radio communication with other terminal devices using a communication method such as the wireless fidelity (Wi-Fi®) method or the Bluetooth (Bluetooth®) method.

The terminal device 10 is, for example, a tablet terminal, smart phone, or so on. When the terminal device 10 is a tablet terminal or smart phone, both the tablet terminal and the smart phone have the structure depicted in FIG. 1. The following description assumes an example in which the learning dictionary of a smart phone is synchronized with that of a tablet terminal. Accordingly, in the following description, to distinguish between the structure of a tablet terminal and that of a smart phone, components in the structure of a tablet terminal are followed by "T" while components in the structure of a smart phone are followed by "S". When terminal devices are collectively described without distinguishing between a tablet terminal and a smart phone, components are not followed by "T" or "S".

That is, as in FIG. 1, a tablet terminal 10T includes a processor 11T, a memory 12T, a touch panel 13T, an LCD 14T, a radio communication unit 15T, and an antenna 16T. The touch panel 13T and the LCD 14T are laminated together. The memory 12T stores a learning dictionary 121T and a synchronization window table 122T.

As in FIG. 1, a smart phone 10S includes a processor 11S, a memory 12S, a touch panel 13S, an LCD 14S, a radio communication unit 15S, and an antenna 16S. The touch panel 13S and the LCD 14S are laminated together. The memory 12S stores a learning dictionary 121S and a synchronization window table 122S.

<Specific Example of the Synchronization Window Table>

FIG. 2 depicts an example of the synchronization window table according to embodiment 1. The synchronization window table 122 depicted in FIG. 2 is the same as the synchronization window table 122T and the synchronization window table 122S. That is, the tablet terminal 10T and the smart phone 10S stores the same window table including the same content.

The synchronization window table 122 includes a model identifier, a terminal type, a screen size, and a synchronization window size as its items.

The model identifier is assigned for each model of the terminal device 10 to uniquely identify the model of the terminal device 10. The model identifier is represented as, for example, the model name of the terminal device 10. Here, the model identifier of the smart phone 10S is assumed to be 10S and the model identifier of the smart phone 10T is assumed to be 10T.

The terminal type is an item that represents the category (such as, for example, a smart phone or tablet terminal) of the terminal device 10.

The screen size is an item that represents the display size of the LCD 14 included in the terminal device 10. Here, for example, the screen size of the smart phone 10S is assumed to be 4.3 inches and that of the tablet terminal 10T to be 10.1 inches.

The synchronization window size is an item that represents the size of an area in the display area of the LCD 14 in which conversion word candidates (may be referred to below as candidates) for an input characters entered from the touch panel 13 are displayed. Of the display area of the LCD 14, the size of an area in which conversion word candidates (may be referred to below as candidates) for an input characters entered from the touch panel 13 are displayed may be referred to below as the candidate display area. The synchronization window size increases as the screen size increases. For example, FIG. 2 indicates an example in which the synchronization window size of the tablet terminal 10T is three times as large as the synchronization window size of the smart phone 10S.

Here, a synchronization window size of the smart phone 10S of 3 indicates that a maximum of three candidates are listed in the candidate display area of the smart phone 10S, of a plurality of conversion word candidates for any input character. Similarly, a synchronization window size of the smart phone 10T of 9 indicates that a maximum of nine candidates are listed in the candidate display area of the smart phone 10T, of a plurality of conversion word candidates for any input character. Accordingly, the synchronization window size is equivalent to the size of the candidate display area.

<Specific Example of Synchronization of the Learning Dictionary>

FIGS. 3 and 4 depict examples of the learning dictionary according to embodiment 1. As depicted in FIGS. 3 and 4, a candidate group including (may be referred to below as a candidate group) a plurality of conversion word candidates for an input character is registered in the learning dictionary 121 for each header character.

The candidate numbers 1 to 10 represent the priorities of the candidates. The processor 11 displays a list of candidates included in the candidate group according to the priorities (in the ascending order of the priority number) for a character input from the touch panel 13. That is, the candidate numbers 1 to 10 represent the order (may be referred to below as the display rank) in which the candidates are listed in the candidate display area. In the tablet terminal 10T with a synchronization window size of 9, for example, candidates 1 to 9 among candidates 1 to 10 are first listed in the candidate display area for a character input from the touch panel 13T. In the smart phone 10S with a synchronization window size of 3, for example, candidates 1 to 3 among candidates 1 to 10 are first listed in the candidate display area for a character input from the touch panel 13S.

The processor 11 learns the history of conversion made by users and gives priorities, that is, display ranks, to candidates based on learning results. For example, the processor 11 gives a higher priority, that is, a higher display rank, to a candidate that has been selected by users a higher number of times.

FIGS. 3 and 4 depict the cases where there is a changed in the display rank of any candidate in candidates registered in the learning dictionary 121T of the tablet terminal 10T. FIG. 3 depicts the case where the changed rank of the candidate is included in the range of display ranks first listed in the synchronization window of the smart phone 10S, that is, in the candidate display area of the smart phone 10S. On the other hand, FIG. 4 depicts the case where the changed rank of the candidate is not included in the range of display ranks first listed in the synchronization window of the smart phone 10S, that is, in the candidate display area of the smart phone 10S.

At time t1 in FIG. 3, for example, a candidate group 21 including 10 conversion word candidates 1 to 10 for header character "a" is registered in the learning dictionary 121T of the tablet terminal 10T. That is, the learning dictionary 121T contains, as of time t1, candidate group 21 including candidates 1 to 10 "ashita", "aibou", "anshin", "aisatsu", "aisai", "akamon", "arajiru", "arajio", "anzen", and "asobi", which correspond to header character "a", in this order.

On the other hand, at time t1, for example, a candidate group 41 including 10 conversion word candidates 1 to 10 for header character "a" is registered in the learning dictionary 121S of the smart phone 10S. That is, the learning dictionary 121S contains, as of time t1, candidate group 41 including candidates 1 to 10 "ashita", "aibou", "anshin", "aisatsu", "aisai", "akamon", "arajiru", "arajio", "anzen", and "asobi", which correspond to header character "a", in this order. Accordingly, candidate group 41 is in sync with candidate group 21 at this time.

The synchronization window size of the tablet terminal 10T is 9, as described above. Accordingly, when "a" is input from the touch panel 13T at time t1, the processor 11T first lists candidates 1 to 9 with the top nine ranks among 10 conversion word candidates in the candidate display area in the order of "ashita", "aibou", "anshin", "aisatsu", "aisai", "akamon", "arajiru", "arajio", and "anzen".

On the other hand, the synchronization window size of the smart phone 10S is 3, as described above. Accordingly, when "a" is input from the touch panel 13S at time t1, the processor 11S first lists candidates 1 to 3 with the top three ranks among 10 conversion word candidates in the candidate display area in the order of "ashita", "aibou", and "anshin".

It is assumed that the user selects candidate 2 "aibou" from candidates 1 to 9 listed at time t1 in the tablet terminal 10T to determine the conversion word "aibou" that corresponds to the input character "a". It is also assumed that the display rank of "aibou" becomes higher than that of "ashita" because "aibou" is selected and the processor 11T learns the selection. Accordingly, the processor 11T changes candidate group 21 including candidate 1 "ashita" and candidate 2 "aibou" at time t1 to a candidate group 22 including candidate 1 "aibou" and candidate 2 "ashita" at time t2. That is, the processor 11T changes the display rank between "ashita" and "aibou" among the 10 candidates registered in the learning dictionary 121T of the tablet terminal 10T.

Since the processor 11T has changed the display ranks of "ashita" and "aibou", the processor 11T determines whether the changed display rank 2 or 1 of "ashita" or "aibou" is included in a synchronization window 31 of the smart phone 10S, that is, in the range of display ranks first listed in the candidate display area. The synchronization window size of the smart phone 10S is 3 as described above, which corresponds to display ranks 1 to 3. Accordingly, the processor 11T determines that the changed display rank 2 or 1 is included in the range of display ranks first listed in the candidate display area of the smart phone 10S.

Since the changed display rank 1 or 2 is included in the range of display ranks first listed in the candidate display area of the smart phone 10S, the processor 11T synchronizes candidates 1 to 10 in candidate group 41 with candidates 1 to 10 in candidate group 22 at time t2. In other words, the processor 11T synchronizes candidate group 41 with candidate group 22 in which display ranks have been changed. That is, candidate group 41 is updated to candidate group 42 through candidate group 22. This makes conversion word candidates 1 to 10 for header character "a" of the tablet terminal 10T as well as their display ranks coincide with those of the smart phone 10S at time t2.

On the other hand, the states of candidate groups 21 and 41 in FIG. 4 are the same as those in FIG. 3, except that, in FIG. 4, the user selected candidate 9 "anzen" and determined "anzen" as the conversion word for the input character "a" among candidates 1 to 9 listed at time t1 in the tablet terminal 10T. In addition, since "anzen" is selected and the processor 11T learns the selection, the display rank of "anzen" becomes higher than that of "arajio". Accordingly, the processor 11T changes candidate group 21 including candidate 8 "arajio" and candidate 9 "anzen" at time t1 to a candidate group 23 including candidate 8 "anzen" and candidate 9 "arajio" at time t2. That is, the processor 11T changes the display rank between "arajio" and "anzen" among the 10 candidates registered in the learning dictionary 121T of the tablet terminal 10T.

Since the processor 11T has changed the display ranks of "arajio" and "anzen", the processor 11T determines whether the changed display rank 9 or 8 of "arajio" or "anzen" is included in the synchronization window 31 of the smart phone 10S, that is, in the range of display ranks first listed in the candidate display area. The synchronization window size of the smart phone 10S is 3 as described above, which corresponds to display ranks 1 to 3. Accordingly, the processor 11T determines that the changed display rank 9 or 8 is not included in the range of display ranks first listed in the candidate display area of the smart phone 10S. The processor 11T synchronizes candidates 1 to 10 in candidate group 41 with candidates 1 to 10 in candidate group 23 at time t3, which is later than time t2 and arrives repeatedly at certain intervals of, for example, 30 minutes. That is, candidate group 41 is updated to candidate group 43 through candidate group 23. This makes conversion word candidates 1 to 10 for header character "a" of the tablet terminal 10T as well as their display ranks coincide with those of the smart phone 10S at time t3, which is later than time t2. Between timings that arrive repeatedly at certain intervals, display ranks may be changed a plurality of times in a candidate group of the learning dictionary 121T.

<Example of Screen Display>

Figure 5A:
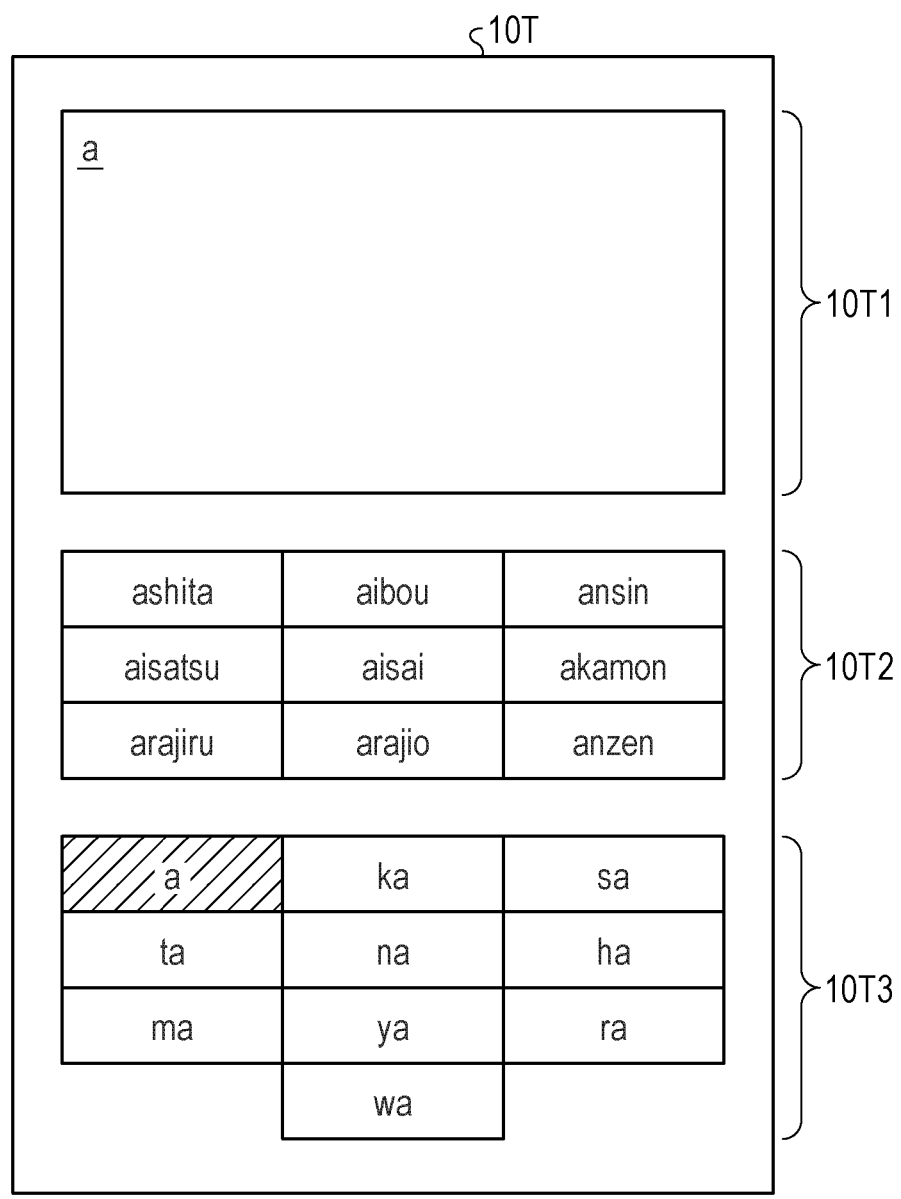
FIG. 5A depicts an example of display of a tablet terminal according to embodiment 1.
Figure 5B:
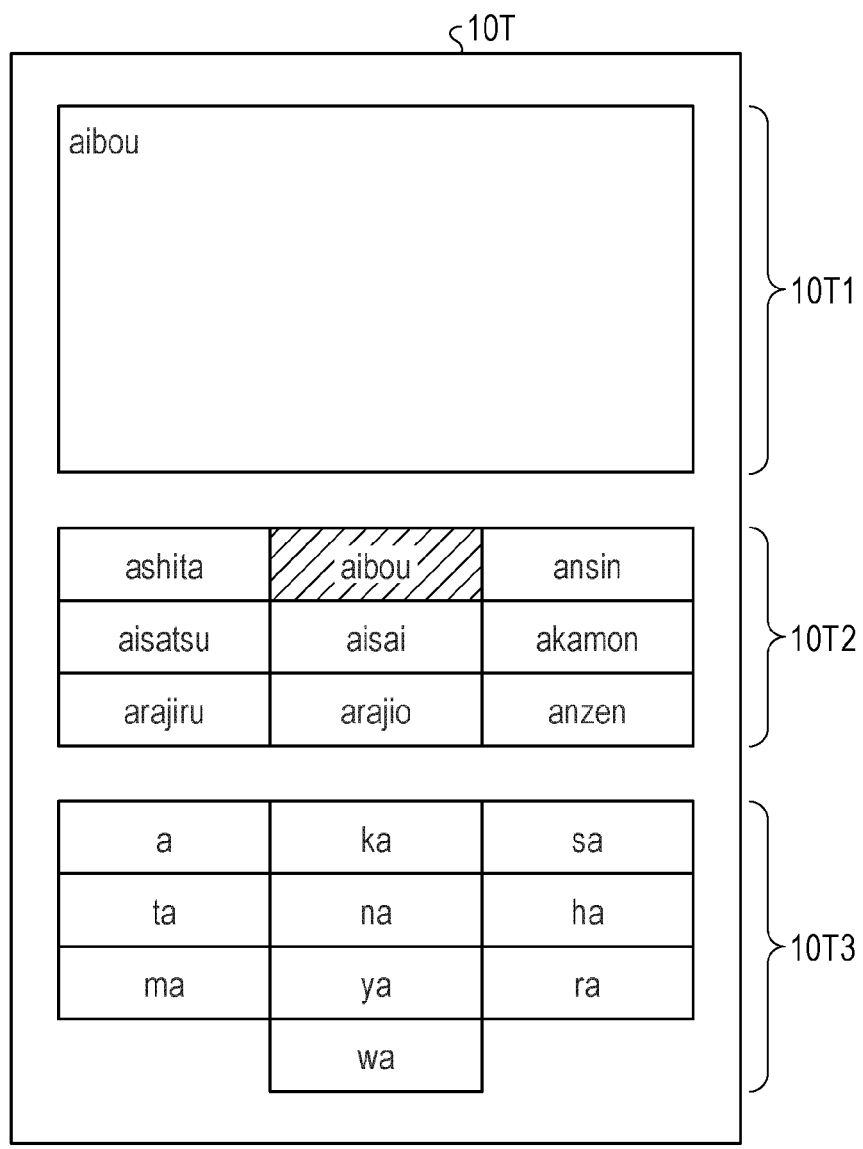
FIG. 5B depicts an example of display of the tablet terminal according to embodiment 1.
Figure 5C:
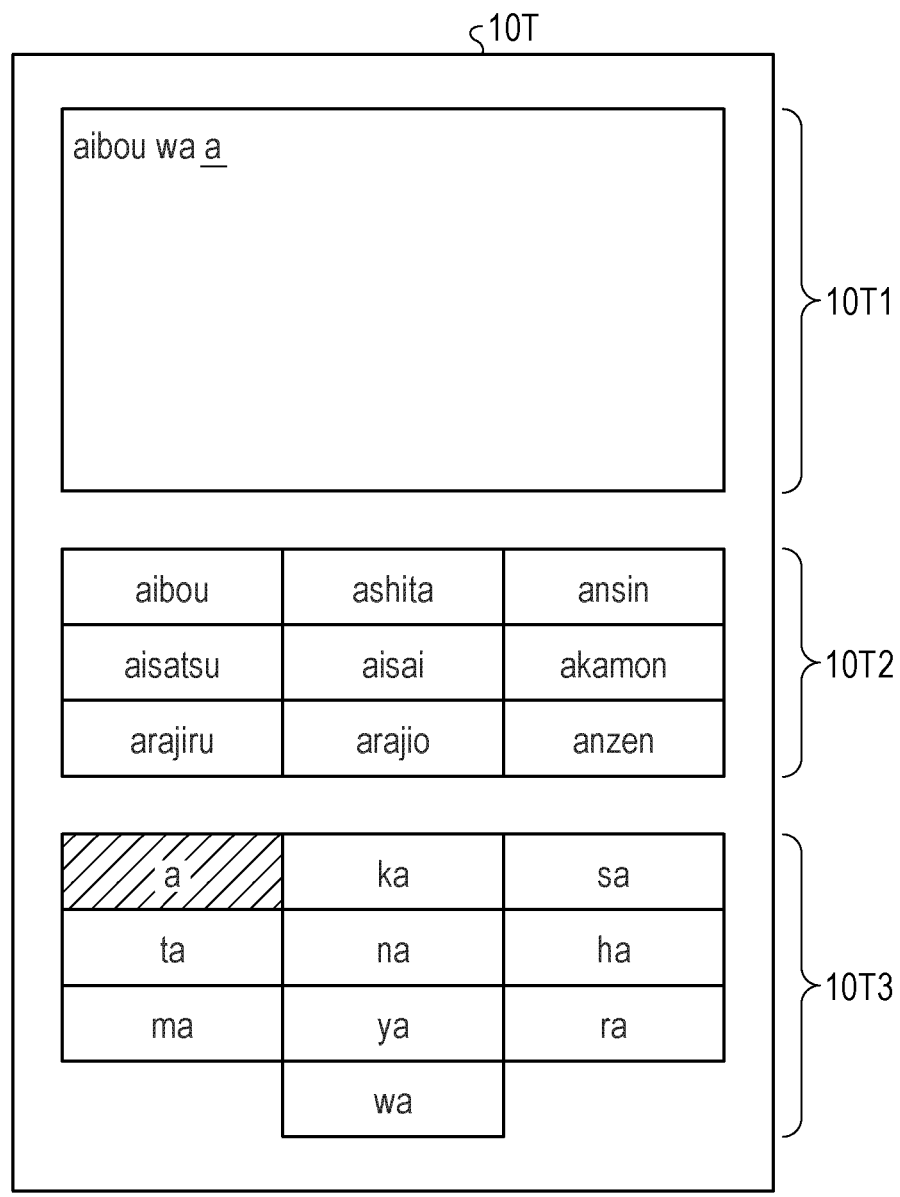
FIG. 5C depicts an example of display of the tablet terminal according to embodiment 1.

FIGS. 5A to 5C depict examples of display of the tablet terminal according to embodiment 1. As depicted in FIGS. 5A to 5C, in the tablet terminal 10T, the display area of the LCD 14T is divided into three display areas (10T1, 10T2, and 10T3) during character input. The display area 10T1 indicates characters input or selected by the user. The display area 10T2 is a candidate display area. Since the synchronization window size of the tablet terminal 10T is 9 as described above, a maximum of nine candidates are listed in the display area 10T2. The display area 10T3 displays input keys for the user to input characters. Input key "A" is used to input "a", "i", "u", "e", and "o". Each time input key "A" is touched, the character displayed in the display area 10T1 changes in the order of "a", "i", "u", "e", and "o".

FIG. 5A depicts the case where a candidate group registered in the learning dictionary 121T is placed in the state of candidate group 21 (FIG. 3). Accordingly, when the user inputs "a", candidates 1 to 9 in candidate group 21 are first listed in the display area 10T2 according to their display ranks.

Then, it is assumed that the user touches and selects "aibou" from the nine candidates displayed in the display area 10T2 as the conversion word for the input character "a", as depicted in FIG. 5B. The processor 11T changes candidate group 21 to candidate group 22, as depicted in FIG. 3.

FIG. 5C depicts the state where the candidate group registered in the learning dictionary 121T is candidate group 22 since the candidate group has been changed from candidate group 21 to candidate group 22. Accordingly, when the user inputs "a", candidates 1 to 9 in candidate group 22 are first listed in the display area 10T2 according to their display ranks. The display ranks of "ashita" and "aibou" are exchanged in the display area 10T2 between FIG. 5A and FIG. 5C.

Figure 6A:
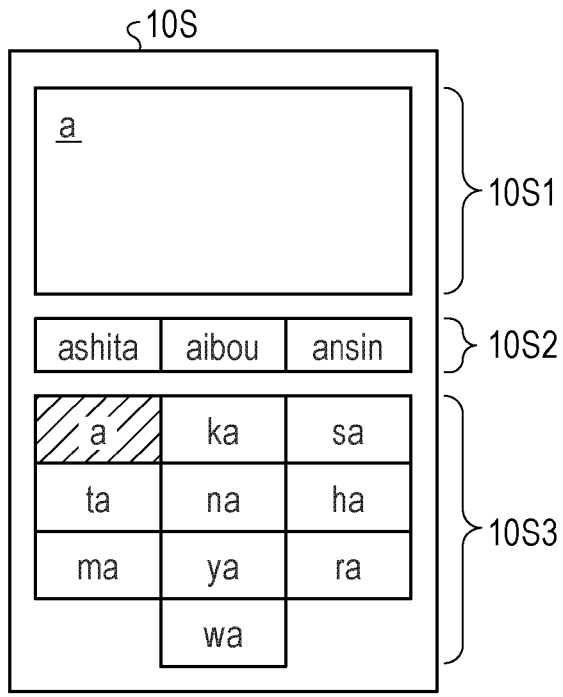
FIG. 6A depicts an example of display of a smart phone according to embodiment 1.
Figure 6B:
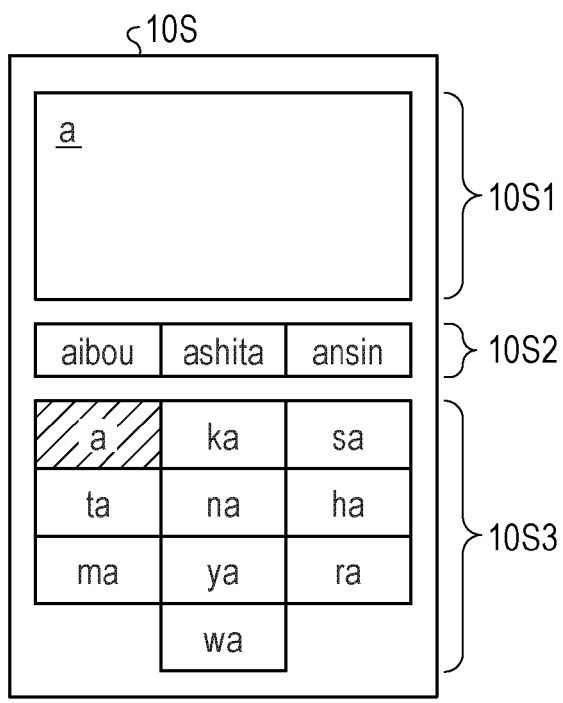
FIG. 6B depicts an example of display of the smart phone according to embodiment 1.

FIGS. 6A and 6B depict examples of display of the smart phone according to embodiment 1. As depicted in FIGS. 6A and 6B, in the smart phone 10S, the display area of the LCD 14S is divided into three display areas (10S1, 10S2, and 10S3) during inputting of characters. The display area 10S1 indicates characters input or selected by the user. The display area 10S2 is the candidate display area. Since the synchronization window size of the smart phone 10S is 3 as described above, a maximum of three candidates are listed in the display area 10S2. The display area 10S3 displays input keys for the user to input characters. Input key "A" is used to input "a", "i", "u", "e", and "o". Each time input key "A" is touched, the character displayed in the display area 10S1 changes in the order of "a", "i", "u", "e", and "o". Other input keys operate similarly.

FIG. 6A depicts the case where a candidate group registered in the learning dictionary 121S is placed in the state of candidate group 41 (FIG. 3). Accordingly, when the user inputs "a", candidates 1 to 3 in candidate group 41 are first listed in the display area 10S2 according to their display ranks.

FIG. 6B depicts the case where a candidate group registered in the learning dictionary 121S is placed in the state of candidate group 42 (FIG. 3) that is synchronized with candidate group 22 registered in the learning dictionary 121T. Accordingly, when the user inputs "a", candidates 1 to 3 in candidate group 42 are first listed in the display area 10S2 according to their display ranks. That is, candidates 1 to 3 displayed in the display area 10S2 in FIG. 6B match candidates 1 to 3 of candidates 1 to 9 displayed in the display area 10T2 in FIG. 5C.

<Processing in the Tablet Terminal and Smart Phone>

Figure 7:
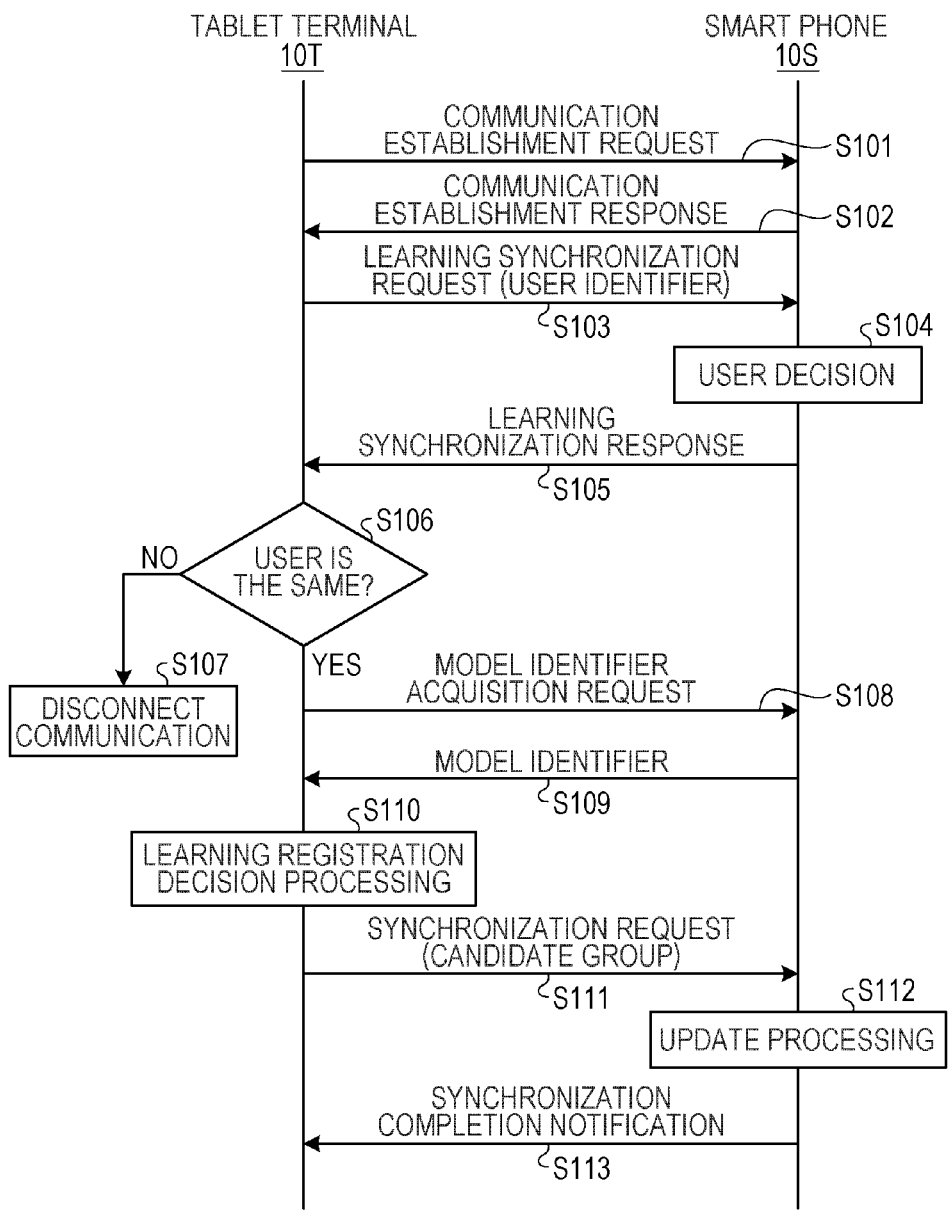
FIG. 7 is a sequence diagram used to describe the synchronization of the learning dictionary according to embodiment 1.

FIG. 7 is a sequence diagram used to describe the synchronization of the learning dictionary according to embodiment 1. Near field radio communication between the tablet terminal 10T and the smart phone 10S in FIG. 7 is performed by the radio communication unit 15T and 15S.

When the tablet terminal 10T and the smart phone 10S enter a range in which near field radio communication is enabled, the processor 11T generates a communication establishment request and lets the radio communication unit 15T transmit the communication establishment request to the smart phone 10S (step S101).

When the smart phone 10S receives the communication establishment request, the processor 11S generates a communication establishment response in response to the communication establishment request and lets the radio communication unit 15S transmit the communication establishment response to the tablet terminal 10T (step S102). When the tablet terminal 10T receives the communication establishment response, a communication channel for near field radio communication is established between the tablet terminal 10T and the smart phone 10S.

When the communication channel for near field radio communication is established, the processor 11T generates a learning synchronization request and lets the radio communication unit 15T transmit the learning synchronization request to the smart phone 10S (step S103). This learning synchronization request includes user-specific user identifiers for uniquely identifying the users of the tablet terminal 10T and the smart phone 10S. The user identifiers are stored in the memory 12T and the memory 12S in advance by the users. For example, Google ID or so on may be used as user identifiers.

If the user of the tablet terminal 10T is the same as that of the smart phone 10S, the user identifier sorted in the memory 12T matches the user identifier sorted in the memory 12S. Accordingly, in the smart phone 10S that receives the learning synchronization request, the processor 11S makes a decision (that is, a user decision) as to whether the user identifier included in the learning synchronization request matches the user identifier stored in the memory 12S (step S104).

If both user identifiers match in step S104, the processor 11S generates a learning synchronization response of a user decision match. On the other hand, if both user identifiers do not match in step S104, the processor 11S generates a learning synchronization response of a user decision mismatch. Then, the processor 11S lets the radio communication unit 15S transmit the learning synchronization response to the tablet terminal 10T (step S105).

In the tablet terminal 10T that receives the learning synchronization response, the processor 11T decides whether the user of the tablet terminal 10T is the same as that of the smart phone 10S (step S106). That is, if the processor 11T decides that the user of the tablet terminal 10T is the same as that of the smart phone 10S when the learning synchronization response indicates a match. On the other hand, if the processor 11T decides that the user of the tablet terminal 10T is not the same as that of the smart phone 10S when the learning synchronization response indicates a mismatch.

When the user of the tablet terminal 10T is not the same as that of the smart phone 10S (No in step S106), the processor 11T disconnects a communication channel for near field radio communication established with the smart phone 10S (step S107).

On the other hand, when the user of the tablet terminal 10T is the same as that of the smart phone 10S (Yes in step S106), the processor 11T generates a model identifier acquisition request. Then, the processor 11T lets the radio communication unit 15T transmit the model identifier acquisition request to the smart phone 10S (step S108).

The model identifier "10S" of the smart phone 10S is stored in the memory 12S of the smart phone 10S in advance. When the smart phone 10S receives the model identifier acquisition request, the processor 11S acquires the model identifier "10S" stored in the memory 12S according to the model identifier acquisition request, and lets the radio communication unit 15S transmit the model identifier "10S" to the tablet terminal 10T (step S109).

When the tablet terminal 10T receives the model identifier of the smart phone 10S, the processor 11T performs learning registration decision processing as described in FIGS. 3 and 4 (step S110). A detailed flow of this learning registration decision processing will be described later. Then, the processor 11T generates a synchronization request and lets the radio communication unit 15T transmit the synchronization request to the smart phone 10S (step S111). This synchronization request includes a candidate group after being changed. More specifically, the candidate group included in the synchronization request is, for example, candidate group 22 (FIG. 3) or candidate group 23 (FIG. 4).

In the synchronization request in step S111, the tablet terminal 10T requests the smart phone 10S to synchronize the candidate group registered in the learning dictionary 121S with the candidate group registered in the learning dictionary 121T. The synchronization request is generated by the processor 11T based on the changed candidate group when a change is made to the candidate group registered in the learning dictionary 121T. The synchronization request in steps S209 and S212 is the same.

When the smart phone 10S receives the synchronization request, the processor 11S updates the candidate group registered in the learning dictionary 121S using the candidate group included in the synchronization request, in response to the synchronization request (step S112). As a result, the candidate group registered in the learning dictionary 121S is synchronized with the candidate group registered in the learning dictionary 121T. More specifically, the synchronized candidate group registered in the learning dictionary 121S is, for example, candidate group 42 (FIG. 3) or candidate group 43 (FIG. 4). A detailed flow of the update processing in step S112 will be described later. Upon completion of update processing, the processor 11S generates a synchronization completion notification and lets the radio communication unit 15S transmit the synchronization completion notification to the tablet terminal 10T (step S113).

When the tablet terminal 10T receives the synchronization completion notification, synchronization of the learning dictionary between the tablet terminal 10T and the smart phone 10S is completed.

Figure 8:
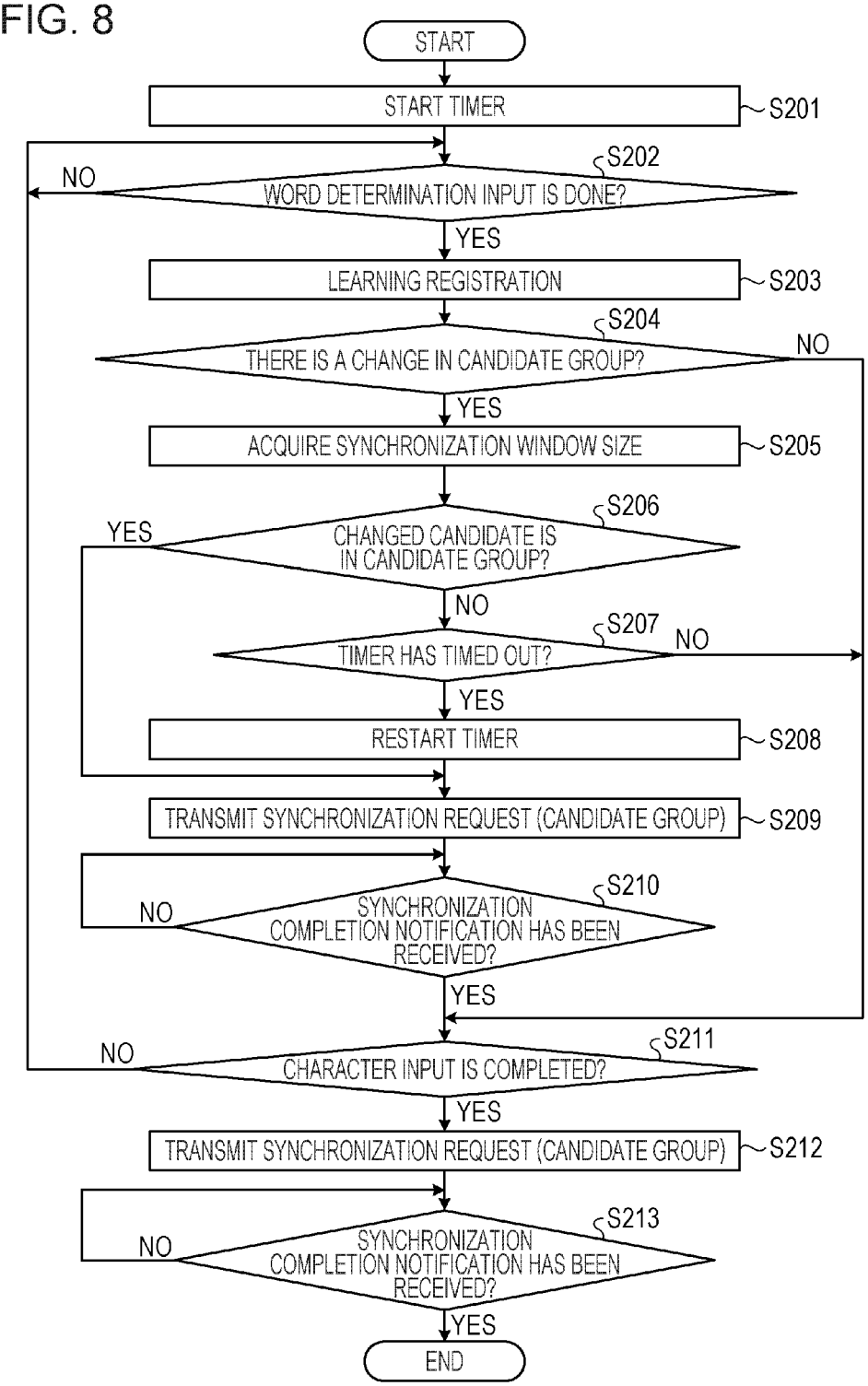
FIG. 8 is a flowchart used to describe processing in the tablet terminal according to embodiment 1.

FIG. 8 is a flowchart used to describe processing in the tablet terminal according to embodiment 1. The processing flow depicted in FIG. 8 corresponds to LEARNING REGISTRATION DECISION PROCESSING (step S110) and SYNCHRONIZATION REQUEST (CANDIDATE GROUP) (step S111) in FIG. 7.

When receiving a model identifier from the smart phone 10S, the processor 11T starts a timer (not depicted) that times out after a certain period of time (step S201).

Next, the processor 11T monitors operation to be performed for the touch panel 13T to wait for a word determination input on the touch panel 13T that determines a conversion work for an input character (No in step S202). The processor 11T determines that a word determination input has been done when, for example, any of a plurality of candidates displayed in the area 10T2 (FIG. 5B) of the LCD 14T is touched.

When a word determination input has been done on the touch panel 13T (Yes in step S202), the processor 11T makes learning registration to the learning dictionary 121T (step S203). For example, in this learning registration, the processor 11T learns the history of conversion made by the user, assigns display ranks to candidates based on the learning results, and registers a candidate group including the candidates to which display ranks have been assigned, in the learning dictionary 121T.

Next, the processor 11T determines whether there a change in the candidate group as depicted in FIGS. 3 and 4, as a result of the learning registration (step S204). That is, the processor 11T determines whether there is a change in the display rank of any candidate in the candidate group registered in the learning dictionary 121T of the tablet terminal 10T. If there is no change in the candidate group (No in step S204), the processing proceeds to step S211.

On the other hand, if there is a change in the candidate group (Yes in step S204), the processor 11T references the synchronization window table 122T based on the model identifier received in step S109 in FIG. 7. Then, the processor 11T acquires the synchronization window size of the smart phone 10S from the synchronization window table 122T (step S205).

Next, the processor 11T whether the changed candidate in the candidate group is a candidate in the synchronization window (step S206).

If the changed candidate is a candidate in the synchronization window (Yes in step S206), the processor 11T immediately generates a synchronization request including the changed candidate and lets the radio communication unit 15T transmit the synchronization request to the smart phone 10S (step S209). When the changed candidate is a candidate in the synchronization window, the changed display rank of any candidate is included in the range of display ranks first listed in the candidate display area of the smart phone 10S.

On the other hand, if the changed candidate is not a candidate in the synchronization window (No in step S206), the processor 11T determines whether the timer has timed out (step S207). When the changed candidate is not a candidate in the synchronization window, the changed display rank of any candidate is not included in the range of display ranks first listed in the candidate display area of the smart phone 10S. If the timer has timed out (Yes in step S207), the processor 11T restarts the timer (step S208). Then, the processor 11T generates a synchronization request including the changed candidate and lets the radio communication unit 15T transmit the synchronization request to the smart phone 10S (step S209).

Next, the processor 11T waits until it receives a synchronization completion notification from the smart phone 10S (No in step S210).

If no change is made to the candidate group (No in step S204), the timer has not timed out (No in step S207), or the synchronization completion notification has been received (Yes in step S210), then the processing proceeds to step S211. In this step, the processor 11T determines whether character input from the touch panel 13T is completed (step S211). The processor 11T determines that character input from the touch panel 13T is completed when, for example, the character input screen depicted in FIGS. 5A to 5C is closed. Alternatively, processor 11T determines that character input from the touch panel 13T is completed when, for example, the user exits the application in which character input is performed. If character input is not completed (No in step S211), the processing returns to step S202.

If character input is completed (Yes in step S211), the processor 11T generates a synchronization request including the changed candidate and lets the radio communication unit 15T transmit the synchronization request to the smart phone 10S (step S212). The process in step S212 is complementary synchronization processing performed when, for example, character input is completed after the timer starts or restarts until it times out.

Then, the processor 11T waits until it receives the synchronization completion notification from the smart phone 10S (No in step S213) and, when it receive the synchronization completion notification (Yes in step S213), ends the processing.

Figure 9:
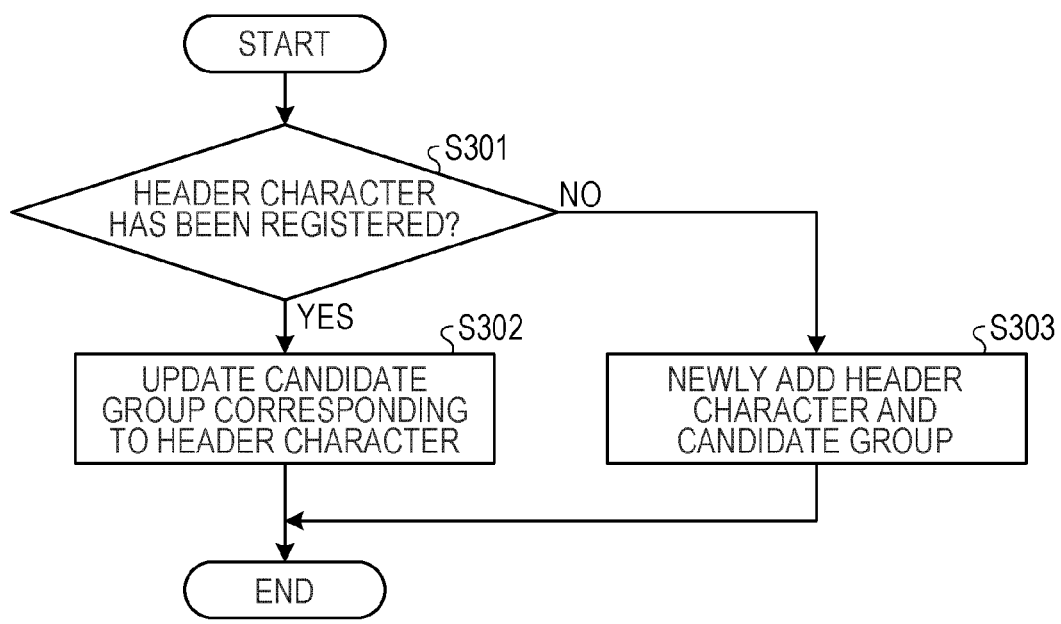
FIG. 9 is a flowchart used to describe processing in the smart phone according to embodiment 1.

FIG. 9 is a flowchart used to describe processing in the smart phone according to embodiment 1. The processing flow depicted in FIG. 9 corresponds to the update processing (step S112) from in FIG. 7.

When receiving a synchronization request from the tablet terminal 10T, the processor 11S determines whether the header character included in the synchronization request is registered in the learning dictionary 121S (step S301).

If the header character included in the synchronization request is already registered in the learning dictionary 121S (Yes in step S301), the processor 11S updates the candidate group corresponding to the header character in the learning dictionary 121S using the candidate group included in the synchronization request (step S302).

On the other hand, if the header character included in the synchronization request is not registered in the learning dictionary 121S (No in step S301), the processor 11S newly registers the candidate group included in the synchronization request in the learning dictionary 121S together with the header character (step S303).

As described above, in the present embodiment, the memory 12T of the tablet terminal 10T stores candidate group 21. If the display rank of any candidate is changed in candidate group 21, the processor 11T of the tablet terminal 10T makes the following decision. The processor 11T determines whether the changed display rank is equal to or higher than a predetermined display rank, that is, whether the changed display rank is included in the range of display ranks first listed in the candidate display area of the smart phone 10S. If the changed display rank is included in the range of display ranks first listed, the processor 11T lets the radio communication unit 15 transmit the candidate group 23 including changed display ranks to the smart phone 10S that stores candidate group 41. Accordingly, when the display rank of any candidate in the learning dictionary 121T is changed, only if the changed display rank is included in the range of display ranks first listed in the candidate display area of the smart phone 10S, the processor 11T synchronizes the learning dictionary 121S with the learning dictionary 121T.

In other words, in the present embodiment, when the changed display rank of any candidate in candidate group 21 is not included in the range of display ranks first listed in the candidate display area of the smart phone 10S, the processor 11T does not let the radio communication unit 15 immediately transmit candidate group 23 including the changed display ranks. That is, even when the display rank of any candidate is changed in the learning dictionary 121T, if the changed display rank is not included in the range of display ranks first listed in the candidate display area of the smart phone 10S, the processor 11T does not immediately synchronize the learning dictionary 121S with the learning dictionary 121T. This keeps the learning dictionary 121S from being synchronized with the learning dictionary 121T each time the display rank of any candidate is changed in candidate group 21. Accordingly, for example, even when a plurality of changes in display ranks are made in the candidate group of the learning dictionary 121T, the changes may be reflected on the learning dictionary 121S in one synchronization process in a batch. Therefore, according to the present embodiment, the electric power for the tablet terminal 10T and the smart phone 10S is saved.

In addition, in the present embodiment, when the changed display rank of any candidate in candidate group 21 is included in the display ranks first displayed in the candidate display area of the smart phone 10S, the learning dictionary 121S is synchronized with the learning dictionary 121T. Accordingly, when the display rank of any candidate is changed in candidate group 21 of the tablet terminal 10T, the candidate group including the changed display rank may be immediately displayed in the smart phone 10S. When, for example, email is received with the smart phone 10S and character input has to be performed to reply the mail during character input with the tablet terminal 10T, user-convenience is improved.

In the present embodiment, if the changed display rank of any candidate in candidate group 21 is not included in the range of display ranks first listed in the candidate display area of the smart phone 10S, the processor 11T performs the following process. The processor 11T lets the radio communication unit 15 transmit candidate group 23 including the changed display ranks to the smart phone 10S repeatedly at certain time intervals. This enables the learning dictionary 121S to be periodically synchronized with the learning dictionary 121T even when the changed display rank of any candidate in candidate group 21 is not included in the range of display ranks first listed in the candidate display area of the smart phone 10S.

In addition in the present embodiment, the processor 11T acquires the range of display ranks first displayed in the candidate display area of the smart phone 10S, that is, the synchronization window size as the number of candidates that are listed in the candidate display area of the smart phone 10S. This enables the processor 11T to determine whether the changed display rank of any candidate is included in the range of display ranks first listed in the candidate display area of the smart phone 10S based on the number of candidates.

Embodiment 2

Embodiment 2 is different from embodiment 1 in that embodiment 2 synchronizes only the candidates in the synchronization window 31 at time t2 in embodiment 1. In the following description, the items that are the same as in embodiment 1 are omitted.

<Specific Example of Synchronization of the Learning Dictionary>

Figure 10:
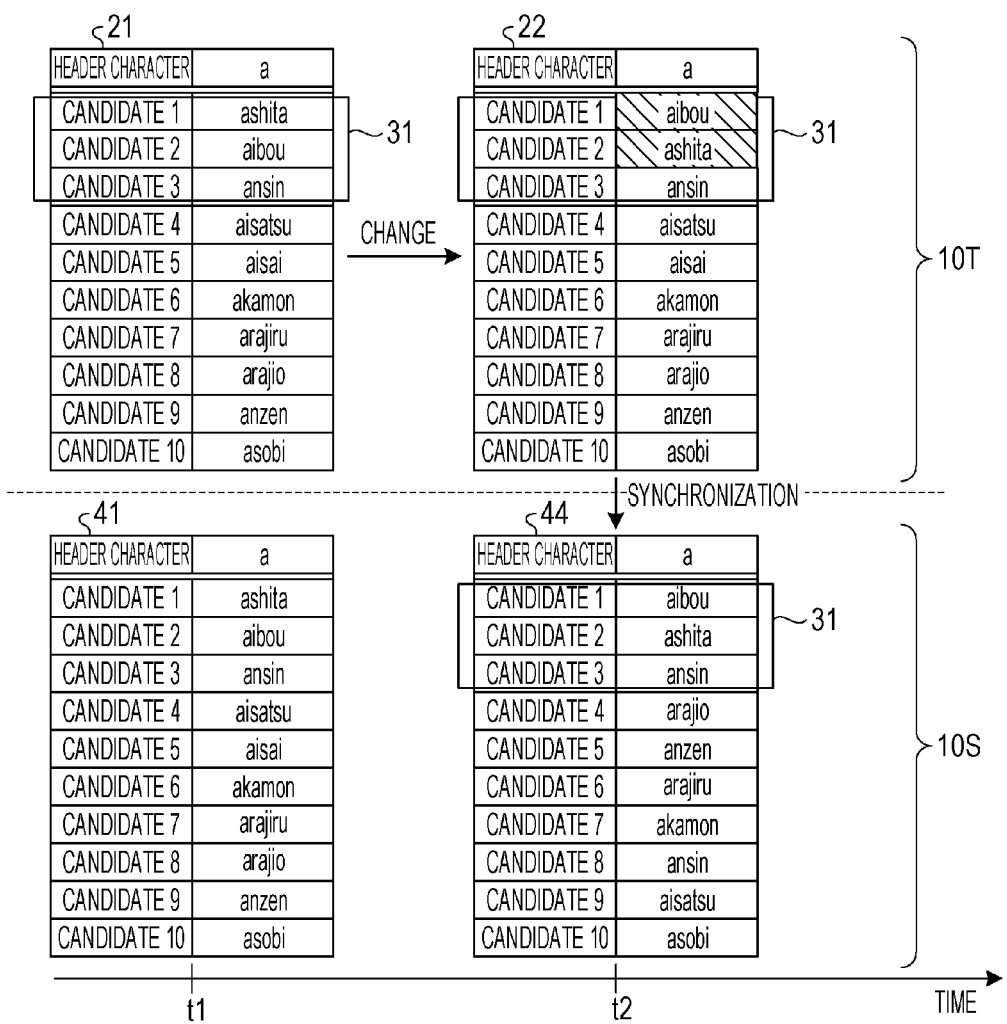
FIG. 10 depicts an example of a learning dictionary according to embodiment 2.

FIG. 10 depicts an example of the learning dictionary according to embodiment 2. FIG. 10 depicts the case where the changed display rank of any candidate in the candidate group registered in the learning dictionary 121T of the tablet terminal 10T is included in the synchronization window of the smart phone 10S, as in FIG. 3.

The states of the candidate groups at time t1 in FIG. 10 are the same as those of the candidate groups at time t1 in FIG. 3. In addition, the state of candidate group 22 at time t2 in FIG. 10 are the same as that of candidate group 22 at time t2 in FIG. 3.

Since the changed display rank 1 or 2 is included in the range of display ranks first listed in the candidate display area of the smart phone 10S in FIG. 10, the candidate group of the smart phone 10S is updated at time t2. That is, as depicted in FIG. 10, a synchronization request including only candidates 1 to 3 in the synchronization window 31 of candidate group 41 is transmitted from the tablet terminal 10T to the smart phone 10S, at time t2. Accordingly, candidate group 41 is updated using only candidates 1 to 3 in the synchronization window 31 of candidate group 22 and, as a result, candidate group 41 is updated to candidate group 44. That is, the processor 11T synchronizes candidates 1 to 3 in candidate group 41 with candidates 1 to 3 in candidate group 22. This makes conversion word candidates 1 to 3 of conversion word candidates 1 to 10 corresponding to header character "a" coincide between the tablet terminal 10T and the smart phone 10S in preference to conversion word candidates 4 to 10.

In candidate group 44, "anshin" is duplicated between candidate 3 and candidate 8. To resolve the duplication, the tablet terminal 10T has to transmit a synchronization request including all candidates in the candidate group 22 to the smart phone 10S in step S212 in FIG. 8.

As described above, in the present embodiment, the processor 11T lets the radio communication unit 15T transmit the candidates included in the range of display ranks first listed in the candidate display area of the smart phone 10S in the candidate group 41, that is, only the candidates in the synchronization window 31. This reduces the time for synchronization of the learning dictionary 121. In addition, it also reduces the amount of synchronization of the learning dictionary 121. Accordingly, the electric power for the tablet terminal 10T and the smart phone 10S is further saved.

Embodiment 3

Embodiment 1 is an example in which kana-kanji conversion is performed on an input character. On the other hand, embodiment 3 is an example in which predictive conversion is performed on an input character. Embodiment 3 is the same as embodiment 1 except that embodiment 3 performs predictive conversion instead of kana-kanji conversion. Accordingly, the description of the sequence and flowchart is omitted in embodiment 3.

<Specific Example of Synchronization of the Learning Dictionary>

Figure 11:
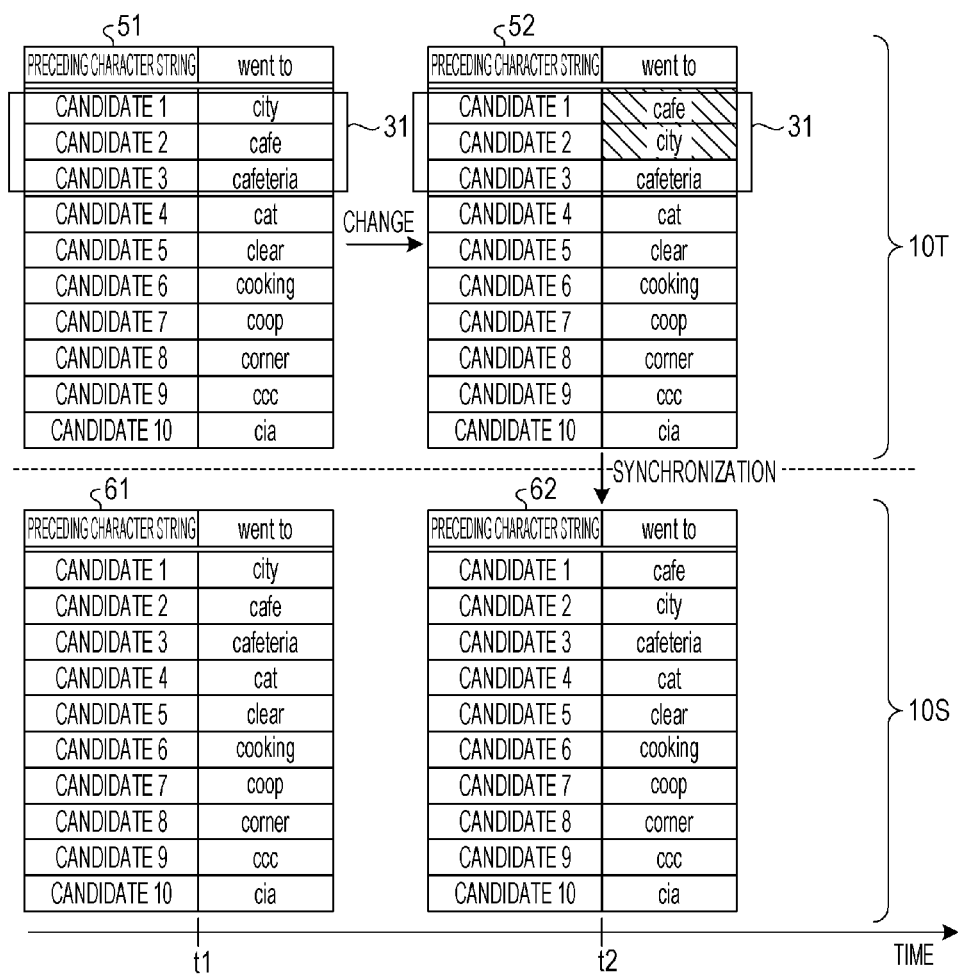
FIG. 11 depicts an example of a learning dictionary according to embodiment 3.
Figure 12:
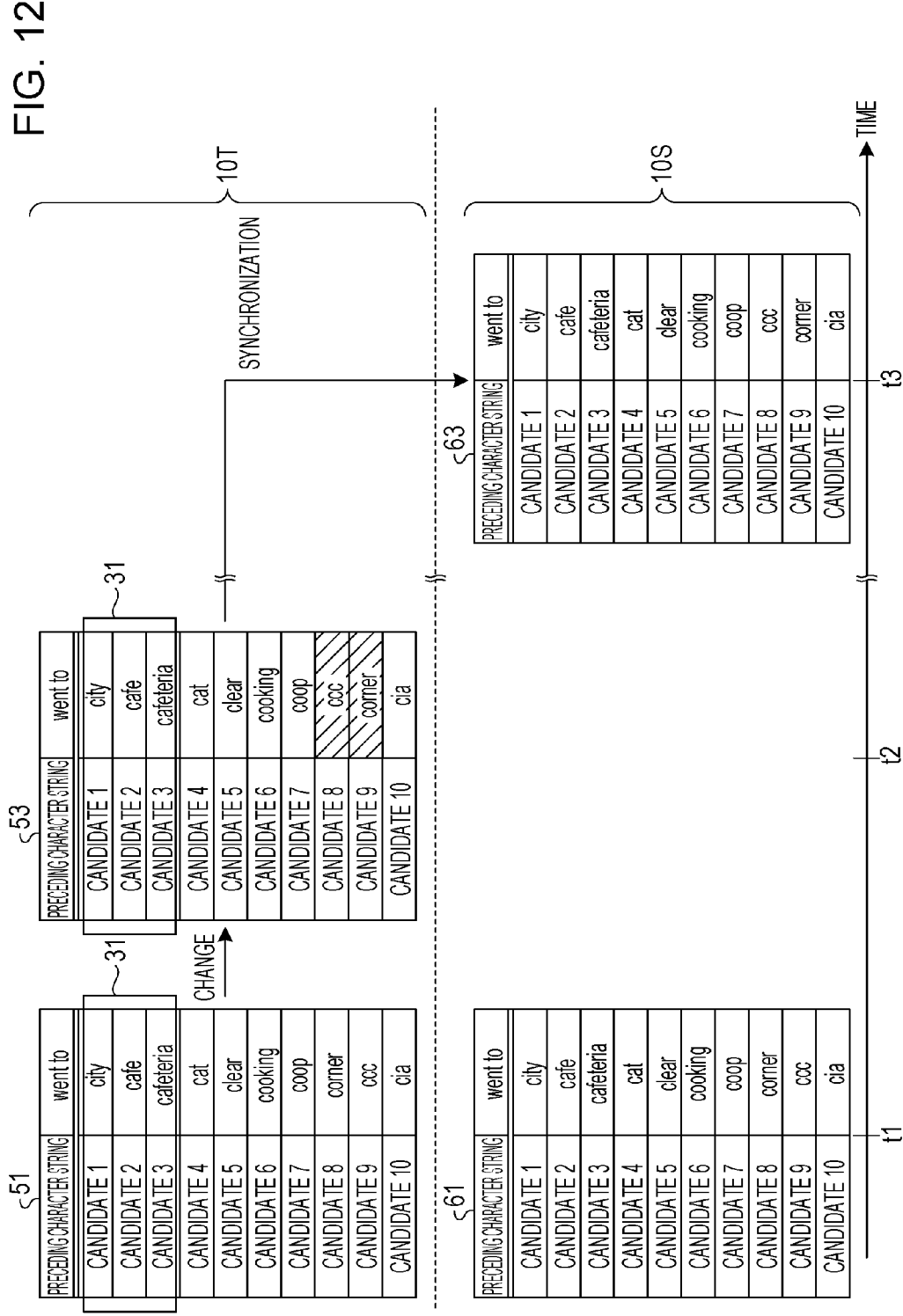
FIG. 12 depicts an example of the learning dictionary according to embodiment 3.

FIGS. 11 and 12 depict examples of a learning dictionary according to embodiment 3. As depicted in FIGS. 11 and 12, a candidate group is registered in the learning dictionary 121 for each preceding character string and input character. FIGS. 11 and 12 depict the case where the display rank of any candidate is changed in the candidate group registered in the learning dictionary 121T of the tablet terminal 10T. FIG. 11 depicts the case where the changed display rank of the candidate is included in the synchronization window of the smart phone 10S, that is, in the range of display ranks first listed in the candidate display area of the smart phone 10S. On the other hand, FIG. 12 depicts the case where the changed display rank of the candidate is not included in the synchronization window of the smart phone 10S, that is, in the range of display ranks first listed in the candidate display area of the smart phone 10S.

At time t1 in FIG. 11, for example, a candidate group 51 including 10 conversion word candidates 1 to 10 is registered as predictive conversion candidates for a input character "c" that follows the preceding character string "went to", for example. That is, at time t1, candidate group 51 including "city", "cafe", "cafeteria", "cat", "clear", "cooking", "coop", "corner", "ccc", and "cia" in this order is registered in the learning dictionary 121T as predictive conversion candidates.

On the other hand, at time t1, a candidate group 61 including 10 conversion word candidates 1 to 10 is registered in the learning dictionary 121S of the smart phone 10S, as predictive conversion candidates for the input character "c" that follows the preceding the character string "went to", for example. That is, at time t1, candidate group 61 including "city", "cafe", "cafeteria", "cat", "clear", "cooking", "coop", "corner", "ccc", and "cia" in this order is registered in the learning dictionary 121S as predictive conversion candidates. At this time, candidate group 61 is synchronized with candidate group 51.

The synchronization window size of the tablet terminal 10T is 9 as described above. Accordingly, when "c" is input from the touch panel 13T after the preceding character string "went to" at time t1, the processor 11T first lists the nine candidates 1 to 9 with the top nine display ranks of ten candidates in the candidate display area in the order of "city", "cafe", "cafeteria", "cat", "clear", "cooking", "coop", "corner", and "ccc".

On the other hand, the synchronization window size of the tablet terminal 10S is 3 as described above. Accordingly, when "c" is input from the touch panel 13S after the preceding character string "went to" at time t1, the processor 11S first lists the three candidates 1 to 3 with the top three display ranks of ten candidates in the candidate display area of the LCD 14S in the order of "city", "cafe", and "cafeteria".

Then, in the tablet terminal 10T, it is assumed that the user selects candidate 2 "cafe" from candidates 1 to 9 listed at time t1 and "cafe" is determined as the conversion word for the input character "c". In addition, it is also assumed that, since "cafe" is selected and the fact is learned by the processor 11T, the display rank of "cafe" becomes higher than that of "city". Therefore, the processor 11T changes candidate 51 in which candidate 1 is "city" and candidate 2 is "cafe" at time t1 to candidate 52 in which candidate 1 is "cafe" and candidate 2 is "city" at time t2. That is, the processor 11T exchanges the display ranks of "city" and "cafe" in the 10 candidates registered in the learning dictionary 121T of the tablet terminal 10T.

Since the processor 11T exchanges the display ranks of "city" and "cafe", it determines whether the changed display rank 2 or 1 of "city" or "cafe" is included in the synchronization window 31 of the smart phone 10S, that is, in the range of display ranks first listed in the candidate display area. The synchronization window size of the smart phone 10S is 3 as described above, which corresponds to display ranks 1 to 3. Accordingly, the processor 11T determines that the changed display rank 2 or 1 is included in the range of display ranks first listed in the candidate display area of the smart phone 10S.

Since the changed display rank 1 or 2 is included in the range of display ranks first listed in the candidate display area of the smart phone 10S, the processor 11T synchronizes candidates 1 to 10 in candidate group 61 with candidates 1 to 10 in candidate group 52 at time t2. In other words, the processor 11T synchronizes candidate group 61 with candidate group 52 including the changed display ranks. That is, candidate group 61 is updated to candidate group 62 through candidate group 52. Accordingly, conversion word candidates 1 to 10 for the input character "c" that follows the preceding character string "went to" as well as their display ranks match between the tablet terminal 10T and the smart phone 10S.

On the other hand, the state of candidate group 51 and 61 in FIG. 12 are the same as those in FIG. 11. In FIG. 12, however, the user selects candidate 9 "ccc" from candidates 1 to 9 listed in the tablet terminal 10T at time t1 and "ccc" is determined to be the conversion word for the input character "c". Since "ccc" is selected and the processor 11T learns the fact, the display rank of "ccc" becomes higher than that of "corner". Accordingly, the processor 11T changes candidate group 51 in which candidate 8 is "corner" and candidate 9 is "ccc" at time t1 to candidate group 53 in which candidate 8 is "ccc" and candidate 9 is "corner" at time t2. That is, the processor 11T exchanges the display ranks of "corner" and "ccc" in 10 candidates registered in the learning dictionary 121T of the tablet terminal 10T.

The processor 11T performs the following processing since the display ranks of "corner" and "ccc" are exchanged. That is, the processor 11T determines whether the changed display rank 9 or 8 of "corner" or "ccc" is included in the synchronization window 31 of the smart phone 10S, that is, in the range of display ranks first listed in the candidate display area. The synchronization window size of the smart phone 10S is 3 as described above, which corresponds to display ranks 1 to 3. Accordingly, the processor 11T determines that the changed display rank 9 or 8 is not included in the range of display ranks first listed in the candidate display area of the smart phone 10S. The processor 11T synchronizes candidates 1 to 10 in candidate group 61 with candidates 1 to 10 in candidate group 53 at time t3, which is later than time t2 and arrives repeatedly at certain intervals of, for example, 30 minutes. That is, candidate group 61 is updated to candidate group 63 through candidate group 53. This makes conversion word candidates 1 to 10 for the input character "c" that follows the preceding character string "went to" as well as their display ranks coincide between the tablet terminal 10T and the smart phone 10S at time t3, which is later than time t2.

<Display Screen Example>

Figure 13A:
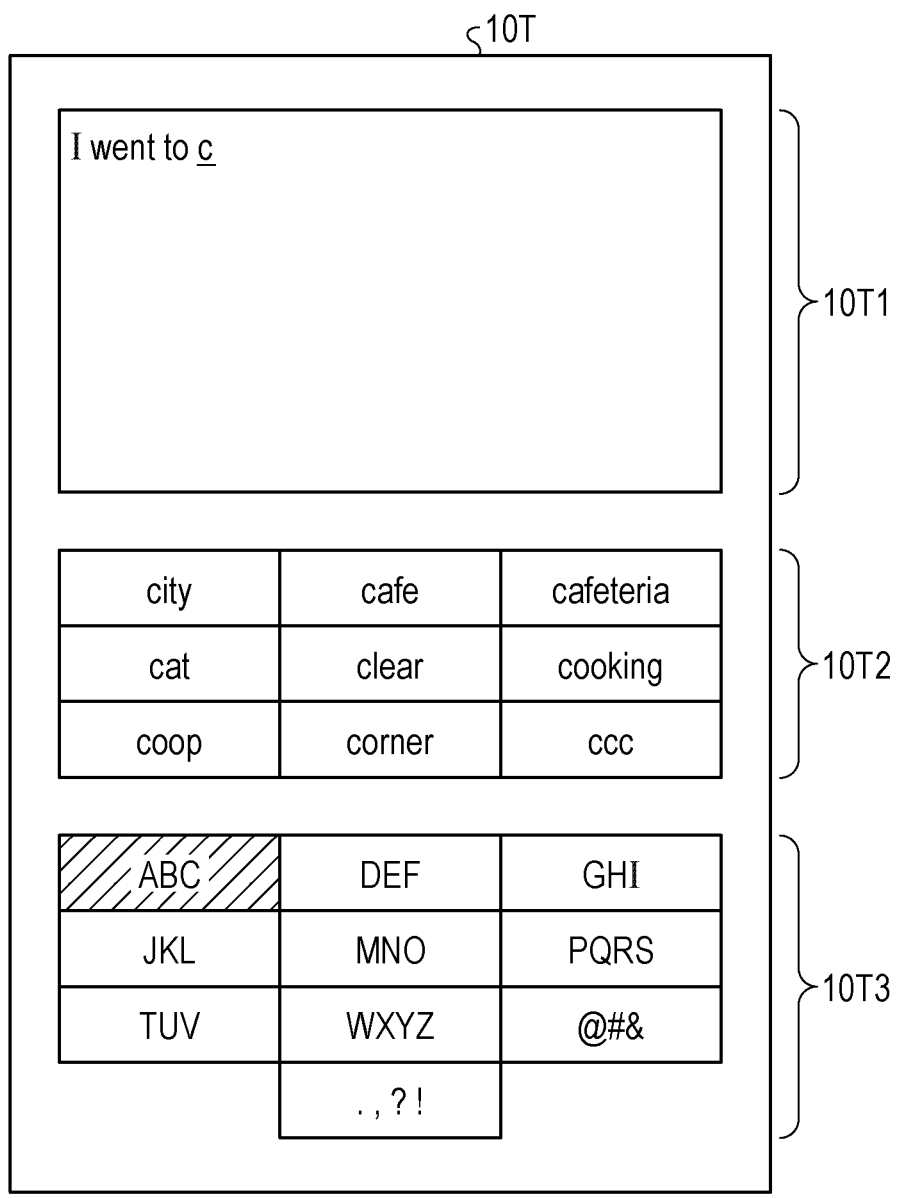
FIG. 13A depicts an example of display of a tablet terminal according to embodiment 3.
Figure 13C:
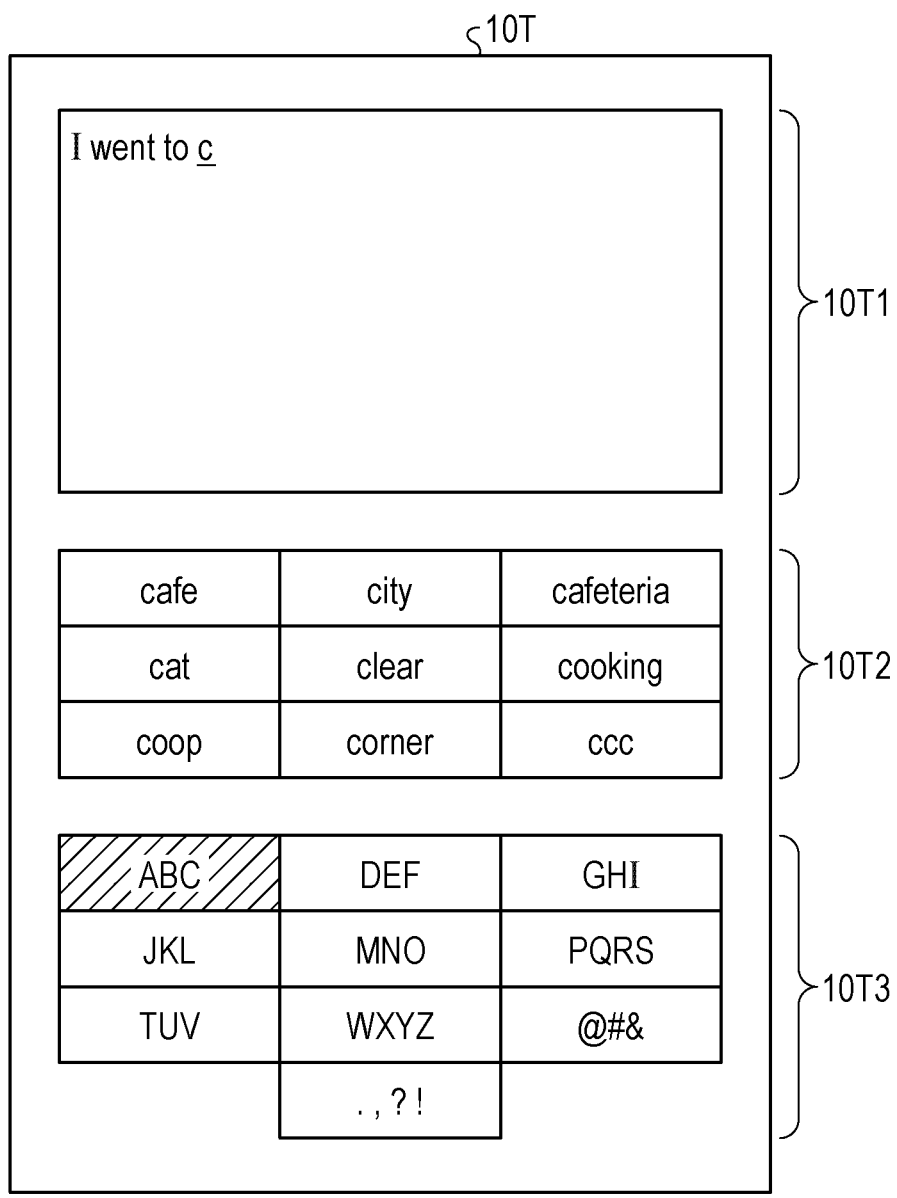
FIG. 13C depicts an example of display of the tablet terminal according to embodiment 3.

FIGS. 13A to 13C depict examples of display of the tablet terminal according to embodiment 3. Since the synchronization window size of the tablet terminal 10T is 9 as described above, a maximum of nine candidates are listed in the display area 10T2. Input keys for the user to input characters are displayed in the display area 10T3. Input key "ABC" is used to input "a", "b", and "c". Each time input key "ABC" is touched, the character displayed in the display area 10T1 changes in the order of "a", "b", and "c". Other input keys operate similarly.

FIG. 13A depicts the state where the candidate group registered in the learning dictionary 121T is candidate group 51 (FIG. 11). Accordingly, when the user inputs "c" after the preceding character string "went to", candidates 1 to 9 in candidate group 51 are first listed in the display area 10T2 according to their display ranks.

Then, it is assumed that the user touches and selects "cafe" as the conversion word for the input character "c" from the nine candidates displayed in the display area 10T2 as depicted in FIG. 5B. The processor 11T changes candidate 51 to candidate 52 as depicted in FIG. 11.

FIG. 13C depicts the state where the candidate group registered in the learning dictionary 121T is candidate group 52, which has been changed from candidate group 51. When the user inputs "c" after the preceding character string "went to", candidates 1 to 9 in candidate group 53 are first listed in the display area 10T2 according to their display ranks. The display ranks of "city" and "cafe" in the display area 10T2 are exchanged between FIG. 13A and FIG. 13C.

Figure 14A:
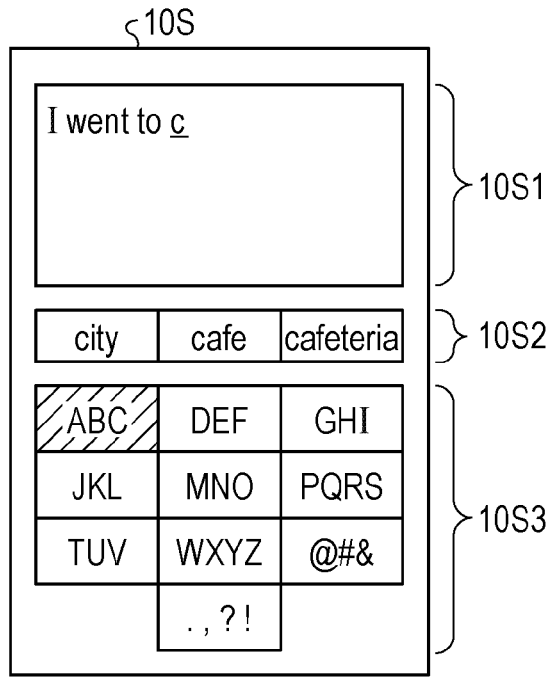
FIG. 14A depicts an example of display of a smart phone according to embodiment 3.
Figure 14B:
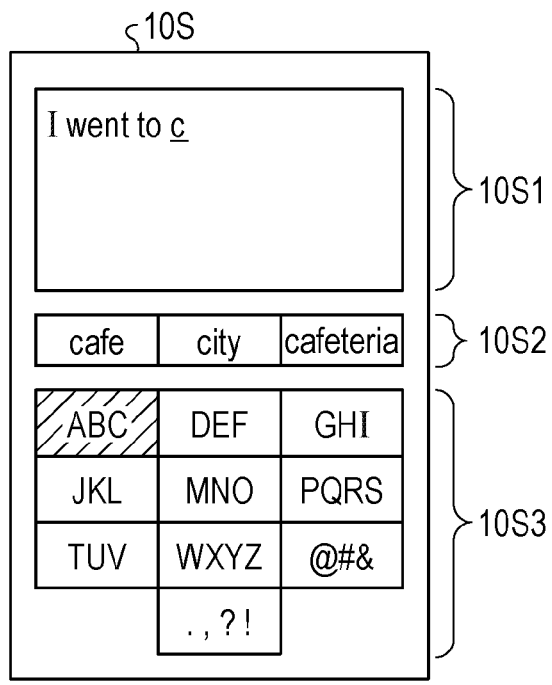
FIG. 14B depicts an example of display of the smart phone according to embodiment 3.

FIGS. 14A and 14B depict examples of display of the smart phone according to embodiment 3. Since the synchronization window size of the smart phone 10S is 3 as described above, a maximum of three candidates are listed in the display area 10S2. The display area 10S3 displays input keys for the user to input characters. Input key "ABC" is used to input "a", "b", and "c". Each time input key "ABC" is touched, the character displayed in the display area 10T1 changes in the order of "a", "b", and "c". Other input keys operate similarly.

FIG. 14A depicts the state where the candidate group registered in the learning dictionary 121S is candidate group 61 (FIG. 11). Accordingly, when the user inputs "c" after the preceding character string "went to", candidates 1 to 3 in candidate group 61 are first listed in the display area 10S2 according to their display ranks.

FIG. 14B depicts the state of candidate group 62 (FIG. 11) where the candidate group registered in the learning dictionary 121S is synchronized with candidate group 52 registered in the learning dictionary 121T. When the user inputs "c" after the preceding character string "went to", candidates 1 to 3 in candidate group 62 are first listed in the display area 10S2 according to their display ranks. Accordingly, candidates 1 to 3 displayed in the display area 10S2 in FIG. 14B match candidates 1 to 3 of candidates 1 to 9 displayed in the display area 10T2 in FIG. 13C.

As described above, embodiment 3 performs predictive conversion in addition to kana-kanji conversion described in embodiment 1. According to embodiment 3, if predictive conversion is performed on an input character, effects similar to those of embodiment 1 are obtained.

Embodiment 4

Embodiment 4 is different from embodiment 3 in that embodiment 4 synchronizes only the candidates in the synchronization window 31 at time t2 in embodiment 3 when predictive conversion is performed on an input character. In the following description, the items that are the same as in embodiments 2 and 3 are omitted.

<Specific Example of Synchronization of the Learning Dictionary>

Figure 15:
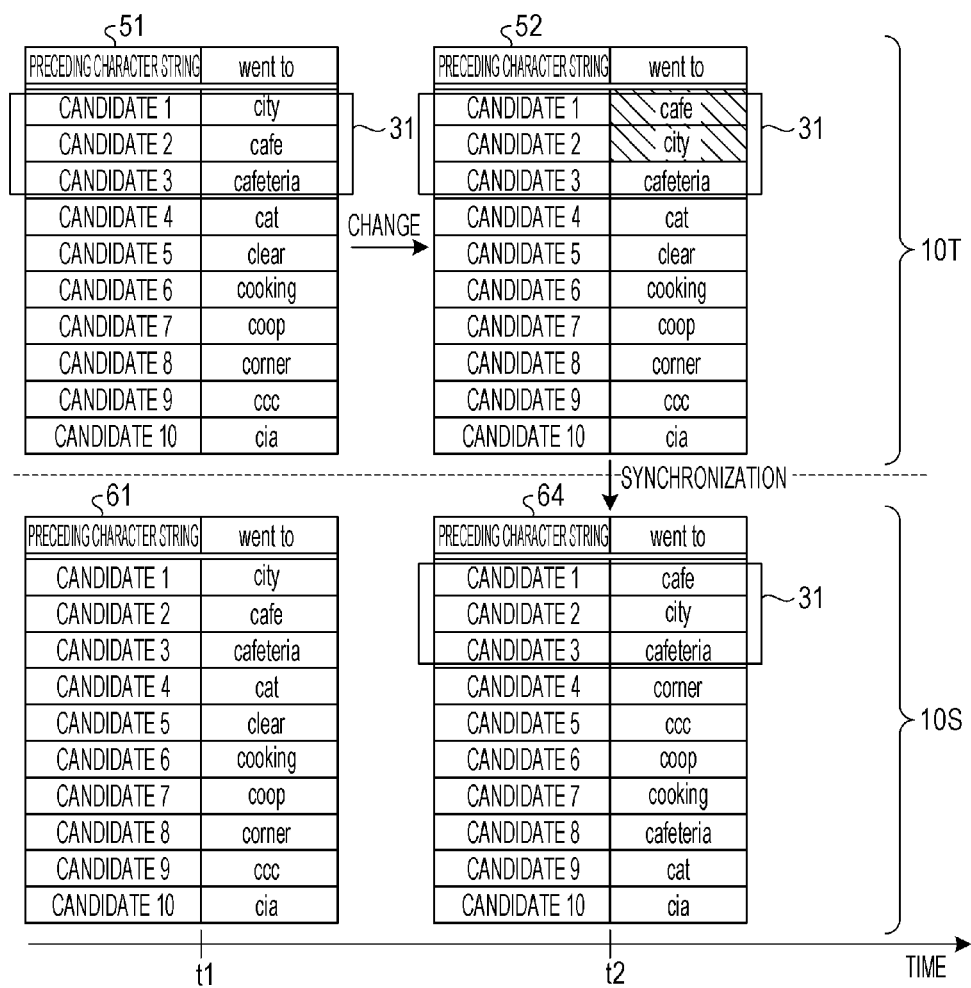
FIG. 15 depicts an example of a learning dictionary according to embodiment 4.

FIG. 15 depicts an example of the learning dictionary according to embodiment 4. FIG. 15 depicts the case where the changed display rank of any candidate in the candidate group registered in the learning dictionary 121T of the tablet terminal 10T is included in the synchronization window of the smart phone 10S, as in FIG. 11.

The states of the candidate groups at time t1 in FIG. 15 are the same as those of the candidate groups at time t1 in FIG.

11. In addition, the state of candidate group 52 at time t2 in FIG. 15 are the same as that of candidate group 52 at time t2 in FIG. 11.

Since the changed display rank 1 or 2 is included in the range of display ranks first listed in the candidate display area of the smart phone 10S in FIG. 15, the candidate group of the smart phone 10S is updated at time t2. That is, as depicted in FIG. 15, a synchronization request including only candidates 1 to 3 in the synchronization window 31 of candidate group 61 is transmitted from the tablet terminal 10T to the smart phone 10S, at time t2. Accordingly, candidate group 61 is updated using only candidates 1 to 3 in the synchronization window 31 of candidate group 52 and, as a result, candidate group 61 is updated to candidate group 64. That is, the processor 11T synchronizes candidates 1 to 3 in candidate group 61 with candidates 1 to 3 in candidate group 52. This makes conversion word candidates 1 to 3 of conversion word candidates 1 to 10 corresponding to the input character "c" coincide between the tablet terminal 10T and the smart phone 10S in preference to conversion word candidates 4 to 10.

In candidate group 64, "cafeteria" is duplicated between candidate 3 and candidate 8. To resolve the duplication, the tablet terminal 10T has to transmit a synchronization request including all candidates in the candidate group 52 to the smart phone 10S in step S212 in FIG. 8.

As described above, embodiment 4 performs predictive conversion instead of kana-kanji conversion in embodiment 2. Therefore, according to embodiment 4, effects similar to those of embodiment 2 are obtained when predictive conversion of an input character is performed.

Embodiment 5

In embodiment 1, the synchronization window size is defined as the number of candidates that are listed in the candidate display area of the smart phone 10S. In contrast, in embodiment 5, the synchronization window size is defined as the total number of characters of candidates that are listed in the candidate display area of the smart phone 10S, which is different from embodiment 1. In the following description, the items that are the same as in embodiment 1 are omitted.

<Specific Example of the Synchronization Window Table>

FIG. 16 depicts an example of a synchronization window table according to embodiment 5. In embodiment 5, the terminal device 10 stores the synchronization window table 123 depicted in FIG. 15 in place of the synchronization window table 122 depicted in FIG. 2.

The synchronization window table 123 includes a model identifier, a terminal type, a screen size, and a synchronization window size as its items. The model identifier, the terminal type, and the screen size are the same as in embodiment 1 (FIG. 2), so their descriptions are omitted.

The synchronization window size indicates the size of the candidate display area in the display area of the LCD 14, as in embodiment 1. The processor 11T acquires the synchronization window size of the smart phone 10S from the synchronization window table 123T, as in embodiment 1.

However, in the case of the synchronization window table 123, a synchronization window size of 18 of the smart phone 10S indicates that candidates with a total number of 18 characters or less may be listed in the candidate display area of the smart phone 10S. Similarly, a synchronization window size of 46 of the tablet terminal 10T indicates that candidates with a total number of 46 characters or less may be listed in the candidate display area of the tablet terminal 10T. That is, the synchronization window size indicates the size of the candidate display area.

For example, the total number of characters of candidates 1 to 10 in the candidate group 51 in FIG. 11 is 48 and the synchronization window size of the tablet terminal 10T is 46. Accordingly, in FIG. 13A, candidates 1 to 9 that contain a total number of 45 characters are displayed in the candidate display area 10T2, but candidate 10 is not displayed because the total number of characters becomes 48.

Similarly, the total number of characters of candidates 1 to 10 in candidate group 61 in FIG. 11 is 48 and the synchronization window size of the smart phone 10S is 18. Accordingly, in FIG. 14A, candidates 1 to 3 that contain a total number of 17 characters are displayed in the candidate display area 10S2, but candidate 4 is not displayed because the total number becomes 20. In FIG. 11, candidates 1 to 3 that contain a total number of 17 characters are displayed in the synchronization window 31, but candidate 4 is not displayed because the total number becomes 20.

As described above, according to the present embodiment, the processor 11T acquires the range of display ranks first listed in the candidate display area of the smart phone 10S, that is, the synchronization window size as the total number of characters of candidates that are listed in the candidate display area of the smart phone 10S. Accordingly, the processor 11T determines, based on the total number of characters of candidates, whether the changed display rank of any candidate is included in the range of display ranks first listed in the candidate display area of the smart phone 10S.

Other Embodiments

[1] In the above embodiments, the candidate group of the smart phone 10S is synchronized with the changed candidate group of the tablet terminal 10T. However, if a change is made in the candidate group of the smart phone 10S, the candidate group of the tablet terminal 10T may be synchronized with the candidate group of the smart phone 10S, as described above.

[2] In the above embodiments, a smart phone and a tablet terminal are used as examples of the terminal device. However, the terminal device is not limited to a smart phone and a tablet terminal. The terminal device may be, for example, a mobile or desktop computer or so on.

[3] The synchronization window size defined as the total number of candidates that are listed in the candidate display area of the smart phone 10S as in embodiment 5 may also be used for kana-kanji conversion in embodiment 1.

[4] The processes described above is also achieved by causing the processor 11 to execute prepared programs. For example, the programs corresponding to the processes described above may be stored in advance in the memory 12 so that the processor 11 reads the programs from the memory 12 to execute as processes. In addition, the programs do not have to be stored in the memory 12 in advance. For example, the programs may be stored in a portable recording medium such as flexible disk (FD), CD-ROM, MO disk, DVD disc, magneto-optical disk, IC card, memory card, or so on that is connected to the terminal device 10, so that the processor 11 may read the programs from the recording medium to execute them as processes. Alternatively, for example, the programs may be stored in a computer, server, or so on connected to the terminal device 10 via the Internet, a LAN, or a WAN, or so on, so that the processor 11 may read the programs from a computer, server, or so on to execute them as processes.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system comprising:
    a first terminal device including a first memory that stores:
        a candidate group including a plurality of conversion word candidates for an input character; and
        a first display ranking that indicates a first order of displaying, in response to a first user input of the input character on a first terminal device, the plurality of conversion word candidates on the first terminal device; and
    a second terminal device that includes:
        a second memory that stores the candidate group; and
        a second display ranking that indicates a second order of displaying, in response to a second user input of the input character on the second terminal device, the plurality of conversion word candidates on the second terminal device; and
        a processor configured to cause the second terminal device to perform operations, the operations comprising:
            determining a change in the second display ranking with respect to one or more display ranks of one or more conversion word candidates of the plurality of conversion word candidates;
            determining, in response to the change in the second display ranking, whether the change in the second display ranking includes one or more display ranks included in a predetermined range of display ranks, wherein the predetermined range of display ranks is a subset of display ranks in the second display ranking and corresponds to a synchronization window size of a first synchronization window displayed on the first terminal device; and
            in response to determining that the change includes one or more display ranks included in the predetermined range of display ranks, transmitting an indication of the change to the first terminal device such that the first display ranking stored in the first memory of the first terminal device includes the change and such that first display ranks of a sub-set of the plurality of conversion word candidates displayed in the first synchronization window are synchronized with second display ranks of the sub-set of the plurality of conversion word candidates displayed in a second synchronization window displayed on the second terminal device.

2. The system according to claim 1, wherein the operations further comprise, in response to determining that the change does not include one or more display ranks included in the predetermined range of display ranks, waiting to transmit the indication of the change to the first terminal device until a certain time interval has passed.

3. The system according to claim 1,
    wherein the indication of the change only includes the one or more display ranks included in the predetermined range of display ranks.

4. The system according to claim 1,
    wherein the predetermined range of display ranks is based on a number of conversion word candidates listed in a predetermined display area of the first synchronization window.

5. The system according to claim 1,
    wherein the predetermined range of display ranks is based on a total number of characters included in conversion word candidates listed in a predetermined display area of the first synchronization window.

6. A conversion word candidate synchronization method, the method comprising:
    determining a change in a first display ranking with respect to one or more display ranks of one or more conversion word candidates of a plurality of conversion word candidates for an input character, wherein the first display ranking is stored in a first memory of a first terminal device and indicates a first order of displaying, in response to a first user input of the input character on the first terminal device, the plurality of conversion word candidates on the first terminal device;
    determining, in response to the change in the first display ranking, whether the change in the first display ranking includes one or more display ranks included in a predetermined range of display ranks, wherein the predetermined range of display ranks is a subset of display ranks in the first display ranking and corresponds to a synchronization window size of a first synchronization window displayed on the first terminal device; and
    in response to determining that the change includes one or more display ranks included in the predetermined range of display ranks, transmitting an indication of the change to a second terminal device such that a second display ranking stored in a second memory of the second terminal device includes the change and such that first display ranks of a sub-set of the plurality of conversion word candidates displayed in the first synchronization window are synchronized with second display ranks of the sub-set of the plurality of conversion word candidates displayed in a second synchronization window displayed on the second terminal device, wherein the second display ranking indicates a second order of displaying, in response to a second user input of the input character on the second terminal device, the plurality of conversion word candidates in the second synchronization window displayed on the second terminal device.

7. A non-transitory conversion word candidate synchronization program that causes a processor included in a first terminal device that stores a candidate group including a plurality of conversion word candidates for an input character,
    to determine a change in a first display ranking with respect to one or more display ranks of one or more conversion word candidates of the plurality of conversion word candidates, wherein the first display ranking is stored in a first memory of the first terminal device and indicates a first order of displaying, in response to a first user input of the input character on the first terminal device, the plurality of conversion word candidates on the first terminal device;

to determine, in response to the change in the first display ranking, whether the change in the first display ranking includes one or more display ranks included in a predetermined range of display ranks, wherein the predetermined range of display ranks is a subset of display ranks in the first display ranking and corresponds to a synchronization window size of a first synchronization window displayed on the first terminal device; and in response to determining that the change includes one or more display ranks included in the predetermined range of display ranks, to direct a communication unit to transmit an indication of the change to a second terminal device such that a second display ranking stored in a second memory of the second terminal device includes the change and such that first display ranks of a sub-set of the plurality of conversion word candidates displayed in the first synchronization window are synchronized with second display ranks of the sub-set of the plurality of conversion word candidates displayed in a second synchronization window displayed on the second terminal device, wherein the second display ranking indicates a second order of displaying, in response to a second user input of the input character on the second terminal device, the plurality of conversion word candidates in the second synchronization window displayed on the second terminal device.

* * * * *